(12) United States Patent
Hsu et al.

(10) Patent No.: US 6,885,795 B1
(45) Date of Patent: Apr. 26, 2005

(54) WAVEGUIDE TAP MONITOR

(75) Inventors: Shih-Hsiang Hsu, Pasadena, CA (US); Dazeng Feng, Arcadia, CA (US); Cheng-Chih Kung, Alhambra, CA (US); Xiaoming Yin, Pasadena, CA (US); Trenton Gary Coroy, Rancho Cucamunga, CA (US)

(73) Assignee: Kotusa, Inc., Monterey Park, CA (US)

( * ) Notice: Subject to any disclaimer, the term of this patent is extended or adjusted under 35 U.S.C. 154(b) by 275 days.

(21) Appl. No.: 10/161,208

(22) Filed: May 31, 2002

(51) Int. Cl.$^7$ ................................................ G02B 6/26
(52) U.S. Cl. ................................................ 385/48; 385/88
(58) Field of Search ........................ 385/39–43, 48–50, 385/88

(56) References Cited

U.S. PATENT DOCUMENTS

| | | | |
|---|---|---|---|
| 4,165,496 A | * | 8/1979 | Di Domenico et al. ....... 372/31 |
| 4,558,920 A | * | 12/1985 | Newton et al. ............... 385/30 |
| 4,618,210 A | | 10/1986 | Kondo |
| 4,747,654 A | | 5/1988 | Yi-Yan |
| 4,813,757 A | | 3/1989 | Sakano et al. |
| 4,836,645 A | | 6/1989 | Leferve et al. |
| 4,846,542 A | | 7/1989 | Okayama |
| 4,857,973 A | | 8/1989 | Yang et al. |
| 4,912,523 A | | 3/1990 | Refi et al. |
| 4,995,689 A | | 2/1991 | Sarraf |
| 5,002,350 A | | 3/1991 | Dragone |
| 5,013,113 A | | 5/1991 | Soref |
| 5,039,993 A | | 8/1991 | Dragone |
| 5,140,149 A | | 8/1992 | Sakata et al. |
| 5,182,787 A | | 1/1993 | Blonder et al. |
| 5,221,984 A | | 6/1993 | Furuyama et al. |
| 5,243,672 A | | 9/1993 | Dragone |
| 5,249,245 A | | 9/1993 | Lebby et al. |
| 5,263,111 A | | 11/1993 | Nurse et al. |
| 5,282,080 A | | 1/1994 | Scifres et al. |

(Continued)

FOREIGN PATENT DOCUMENTS

| | | |
|---|---|---|
| EP | 0647861 A1 | 4/1995 |
| EP | 0985942 A2 | 3/2000 |
| JP | 63-197923 | 7/1988 |
| JP | 2-179621 | 7/1990 |
| JP | 404358105 A | 12/1992 |
| JP | 6-186598 | 8/1994 |

OTHER PUBLICATIONS

Abe, et al., *Optical Path Length Trimming Technique using Thin Film Heaters for Silica–Based Waveguides on SI*, Electronics Letters, Sep. 12, 1996, vol. 32—No. 19, pp. 1818–1820.

Albert, J., *Planar Fresnel Lens Photoimprinted in a Germanium–Doped Silica Optical Waveguide*, Optics Letters, May 15, 1995, vol. 20—No. 10, pp 1136–1138.

Aman, M.C., *Calculation of Metal–Clad Ridge–Waveguide (MCRW) Laser Modes by Mode Coupling Technique*, Journal of Lightwave Technology, vol. LT–4, No. 6, Jun. 1986, p. 689–693.

(Continued)

*Primary Examiner*—Ellen E. Kim
(74) *Attorney, Agent, or Firm*—Gavrilovich, Dodd & Lindsey, LLP

(57) ABSTRACT

An optical component is disclosed. The optical component includes a tap waveguide and a primary waveguide positioned on a base. The tap waveguide is configured to receive a portion of a light signal traveling along the primary waveguide. The portion of the light signal received by the tap waveguide is the tapped portion of the light signal. A direction changing region is configured to receive the tapped portion of the light signal from the tap waveguide and to direct the tapped portion of the light signal travels away from the base. A light sensor is configured to receive the tapped portion of the light signal from the direction changing region.

46 Claims, 14 Drawing Sheets

U.S. PATENT DOCUMENTS

| | | | |
|---|---|---|---|
| 5,333,216 A | | 7/1994 | Sakata et al. |
| 5,347,601 A | | 9/1994 | Ade et al. |
| 5,391,869 A | | 2/1995 | Ade et al. |
| 5,412,744 A | | 5/1995 | Dragone |
| 5,435,734 A | | 7/1995 | Chow |
| 5,450,511 A | | 9/1995 | Dragone |
| 5,467,418 A | | 11/1995 | Dragone |
| 5,511,142 A | | 4/1996 | Horie et al. |
| 5,517,589 A | | 5/1996 | Takeuchi |
| 5,581,643 A | | 12/1996 | Wu |
| 5,600,741 A | * | 2/1997 | Hauer et al. ............... 385/35 |
| 5,641,956 A | | 6/1997 | Vengsarkar et al. |
| 5,652,813 A | | 7/1997 | Wilson |
| 5,706,377 A | | 1/1998 | Li |
| 5,764,832 A | * | 6/1998 | Tabuchi ..................... 385/49 |
| 5,786,925 A | | 7/1998 | Goossen et al. |
| 5,835,458 A | * | 11/1998 | Bischel et al. .......... 369/44.12 |
| 5,841,931 A | | 11/1998 | Foresi et al. |
| 5,910,012 A | | 6/1999 | Takeuchi |
| 5,938,811 A | | 8/1999 | Greene |
| 5,988,842 A | | 11/1999 | Johnsen et al. |
| 6,005,995 A | | 12/1999 | Chen et al. |
| 6,027,255 A | * | 2/2000 | Joo et al. ..................... 385/88 |
| 6,081,639 A | * | 6/2000 | Kagami et al. ............... 385/32 |
| 6,108,472 A | | 8/2000 | Rickman et al. |
| 6,108,478 A | | 8/2000 | Harpon et al. |
| 6,118,909 A | | 9/2000 | Chen et al. |
| 6,275,628 B1 | | 8/2001 | Jones et al. |
| 6,316,281 B1 | | 11/2001 | Lee et al. |
| 6,393,172 B1 | | 5/2002 | Brinkman et al. |
| 6,393,183 B1 | | 5/2002 | Worley |
| 6,406,196 B1 | * | 6/2002 | Uno et al. ..................... 385/89 |
| 6,504,965 B1 | | 1/2003 | Paniccia et al. |
| 6,538,243 B1 | | 3/2003 | Bohn et al. |
| 6,567,585 B1 | * | 5/2003 | Harris ........................ 385/33 |
| 6,567,590 B1 | * | 5/2003 | Okada et al. ................ 385/49 |
| 6,658,176 B1 | * | 12/2003 | Amantea ..................... 385/16 |
| 2002/0044741 A1 | | 4/2002 | Takeuchi et al. |

OTHER PUBLICATIONS

Amann, M.C. et al, *Calculation Of The Effective Refractive-Index Step For The Metal-Cladded-Ridge-Waveguide Laser*, Applied Optics, vol. 20, No. 8, Apr. 15, 1981 p. 1483-1486.*

Baba, S. et al., *A Novel Integrated-Twin-Guide (ITG) Optical Switch with a Built-in TIR Region*; IEEE Photonics Technology Letters; vol. 4, No.5, May 1992, p. 486-488.*

Benson, T.M., *Etched-Wall Bent-Guide Structure for Integrated Optics in the III-V Semiconductors*; Journal of Lightwave Technology, vol. LT-2, No. 1, Feb. 1984; p. 31-34.*

Berry, G.M. et al., *Analysis Of Multiplayer Semiconductor Rib Waveguides With High Refractive Index Substrates*, Electronics Letters; vol. 29, No. 22; Oct. 28, 1993, p. 1941-1942.*

Betty, I. et al., *A Roburst, Low-Crosstalk, InGaAsP/InP Total-Internal-Reflection Switch For Optical Cross-Connect Application*, no date.*

Burke, S.V., *Spectral Index Method Applied to Coupled Rib Waveguides*; Electronics Letters, vol. 25, No. 9, Apr. 27, 1989, p. 605-606.*

Burns, W.K. et al., *Model Conversion in Planar-Dielectric Separating Waveguides*; IEEE Journal of Quantum Electronics, vol. QE-11, No. 1, Jan. 1975; p. 32-39.*

Cai, Y. et al., *A Novel Three-Guide Optical Coupler Using A Taper-Formed Waveguide*; Appl. Phys 69(5), Mar. 1991; p. 2810-2814.*

Cavailles, J.A. et al., *First Digital Optical Switch Based on InP/GaInAsP Double Heterostructure Waveguides*; Electronics Letters, vol. 27, No. 9, Apr. 25, 1991, p. 699-700.*

Chen, R.T. et al., *Design and Manufacturing of WDM Devices*; Proceedings of SPIE vol. 3234, no date.*

Clemens, et al., *Wavelength-Adaptable Optical Phased Array in $SiO_2$-$Sl_1$* Photonics Technology Letters, Oct. 1995, vol. 7—No. 10, 1040-1041.*

Dagli, N. et al., *Analysis of Rib Dielectric Waveguides*; IEEE Journal of Quantum Electronics, vol. QE-21, No. 4 Apr. 1985, p. 315-321.*

Dagli, N. et al., *Theoretical and Experimental Study of the Analysis and Modeling of Integrated Optical Components*; IEEE Journal of Quantum electronics, vol. 24, No. 11, Nov. 1988; p. 2215-2226.*

Deri, R.J., et al., *Low-Loss GaAs/AlGaAs Waveguide Phase Modulator Using A W- Shaped Index Profile*; Sep. 6, 1988.*

Deri, R.J., et al., *Low-Loss Multiple Quantum Well GaInAs/InP Optical Waveguides*; Feb. 21, 1989.*

Devaux, F. et al., *20Gbit/s Operation of a High-Efficiency InGaAsP/InGaAsP MQW Electroabsorption Modulator With 1.2-V Drive Voltage*; IEEE Photonics Technology Letters, vol. 5, No. 11, Nov. 1993, p. 1288-1290.*

Doerr, C.R. et al., *Chirping Of The Waveguide Grating Router For Free-Spectral-Range Mode Selection In The Multifrequency Laser*, IEEE Photonics Technology Letters Apr. 1996 vol. 8——No. 4, pp 500-502.*

Doerr, C.R. et al., *Chromatic Focal Lane Displacement in the Parabolic Chirped Waveguide Grating Router*, May 1997, vol. 9—No. 5, pp 625-627.*

Dragone, c. *Efficient N—N Star Couplers Using Fourier Optics*, pp 479-48, Mar. 1989, vol. 7—No. 3, Journal of Lightwave Technology.*

Fischer, et al., *Singlemode Optical Switches Based on SOI Waveguides with Large Cross-Section*, Electronics Letters, Mar. 3, 1994, vol. 30—No. 5, pp. 406-408.*

Fischer, K. et al, *Sensor Application Of SiON Integrated Optical Waveguides On Silicon*; Elevier Sequoia, 1992; p. 209-213.*

Fish, G. et al., *Monolithic InP Optical Crossconnects: 4×4 and Beyond*, JWB2-1, P. 19-21, no date.*

Furuta, H. et al, *Novel Optical Waveguide For Integrated Optics*, Applied Optics, vol. 13, No. 2, Feb. 1974, p. 322-326.*

Gini, E. et al., *Low-Loss Self-Aligned Optical Waveguide Comer Mirrors in InGaAsP/InP*, We P2.22, no date.*

Goel, K. et al *Design Considerations for Low Switching Voltage Crossing Channel Switches*; Journal of Lightwave Technology, vol. 6, No. 6, Jun. 1988; p. 881-886.*

Granestrand, P. et al., *Integrated Optical 4×4 Switch Matrix with Digital Optical Switches*; Electronics Letters, vol. 26, No. 1, Jan. 4, 1990; p. 4-5.

Himeno, A. et al., *Loss Measurement and Analysis of High-Silica Reflection Bending Optical Waveguides*, Journal of Lightwave Technology, vol. 6—No. 1, 41-46.

Hsu, K.Y. et al., *Photonics devices and Modules*, www.c-c.nctu.edu.tw/~ctr/lee_mti/research_topic/photonic_devices_modeles.htm. pp 1-3, no date.

Huang, T.C. et al., *Depletion Edge Translation Waveguide Crossing Optical Switch*; Photonics Technology Letters; vol. 1, No. 7, Jul. 1989 p. 168-170.

Hutcheson, L.D. et al., *Comparison of Bending Losses in Integrated Optical Circuits*; Optics Letters, vol. 5, No. 6, Jun. 1980, p. 360–362.

Inoue, H. et al., *Low Loss GaAs Optical Waveguides*, Journal of Lightwave Technology, vol. LT–3, No. 6, Dec. 1985; p. 204–209.

Irace, A. et al., *Fast Silicon–on–Silicon Optoelectronic Router Based on a BMFET Device*, Journal of Selected Topics in Quantum Electronics, Jan./Feb. 2000, vol. 6—No. 1, pp. 14–18.

Ito, F. et al., *Carrier–Injection–Type Optical Switch in GaAs With A 1.06–1.55 μm Wavelength Range*; Appl. Physics Letters, 54(2) Jan. 9, 1989; p. 134–136.

Jackman, N. et al., *Optical Cross Connects for Optical Networking*; Bell Labs Technical Journal, Jan.–Mar. 1999; p. 262–281.

Johnston, I.R., et al., *Silicon–Based Fabrication Process For Production Of Optical Waveguides*; IEE Proc–Optoelectron., vol. 143, No. 1, Feb. 1996, p. 37–40.

Kaenko, A. et al., *Athermal Silica–based Arrayed–waveguide Grating (AWG) Multiplexers with New Low Loss Groove Design*; Tu01-1, p. 204–206, no date.

Kasahara, R. et al., *Low–Power Consumption Slica–Based 2×2 Thermooptic Switch Using Trenched Silicon Substrate*, IEEE Photonics Technology Letters, vol. 11, No. 9, Sep. 1999, p. 1132–1134.

Khan, M.N. et al., *Fabrication–Tolerant, Low–Loss, and High–Speed Digital Optical Switches in InGaAsP/InP Quantum Wells*; Proc $21^{st}$ Eur.Conf.on Opt.Comm.(ECOC '95–Brussels), p. 103–106, no date.

Khan, M.N. et al., *High–Speed Operation of Quantum Well Electron Transfer Digital Optical Switches*; p. 102–102c, no date.

Kirihara, T. et al., *Lossless And Low Crosstalk 4'4 Optical Switch Array; Electronics And Communications In Japan*, Part 2, vol. 77, No. 11, 1994, p. 73–81.

Kirihara, T. et al., *Lossless and Low–Crosstalk Characteristics in an InP–Based 2×2 Optical Switch*, IEEE Photonics Technology Letters, vol. 5, No. 9 Sep. 1993, p. 1059–1061.

Kokubun, Y. et al., *Athermal Waveguides for Temperature–Independent Lightwave Devices*, Nov. 1993, 1297–1298, vol. 5—No. 11, IEEE Photonics Technology Letters.

Kokubun, Y. et al., *Temperature–Independent Narrowband Optical Filter at 1.3 μm Wavelength by an Athermal Waveguide*, Oct. 10, 1995, vol. 32—No. 21, Electronics Letters.

Kokubun, Y. et al., *Temperature–Independent Optical Filter at 1.55 μm Waveguide Using a Silica–Based Athermal Waveguide*, Feb. 19, 1998, vol. 34—No. 4, Electronics Letters.

Kokubun, Y. et al., *Three–Dimensional Athermal Waveguides for Temperature Independent Lightwave Devices*, Jul. 21, 1994, vol. 30—No. 15, Electronics Letters.

Kostrzewa, C. et al., *Tunable Polymer Optical Add/Drop Filter for Multiwavelength Networks*, Photonics Letters, Nov. 1997, vol. 9—No. 11, 1487–1489.

Laakman, K. D. et al., *Waveguides: Characteristic Modes Of Hollow Rectangular Dielectric Waveguides*; Applied Optics, vol. 15, No. 5, May 1976; p. 1334–1340.

Lee, T.P. et al., $Al_xGa_{1-x}As$ *Double–Heterostructure Rib–Waveguide Injection Laser*, IEEE Journal of Quantum Electronics; vol. QE–11, No. 7, Jul. 1975; p. 432–435.

Liu, Y.L. et al., *Silicon 1×2 Digital Optical Switch Using Plasma Dispension*; Electronics Letters, vol. 30, No. 2, Jan. 20, 1994; p. 130–131.

Mak, G. et al., *High–Speed Bulk InGaAsP–inP Electroabsorption Modulators with Bandwidth in Excess of 20 GHz*, IEEE Photonics Technology Letter, vol. 2, No. 10 Oct. 1990, p. 730–733.

Marcatili, E., *Improved Coupled–Mode Equations for Dielectric Guides*; IEEE Journal of Quantum Electronics, vol. QE–22, No. 6, Jun. 1986; p. 988–993.

Marcatili, E.A.J., *Bends in Optical Dielectric Guides*; The Bell System Technical Journal, Sep. 1969; p. 2103–2132.

Marcatili, E.A.J., *Dielectric Rectangular Waveguide and Directional Coupler for Integrated Optics*; The Bell System Technical Journal, Sep. 1969 p. 2071–2101.

Marcatili, E.A.J., *Slab–Coupled Waveguides*; The Bell System Technical Journal, Apr. 1974; American Telephone & Telegraph Company, vol. 53, No. 4, Apr. 1974.

Mirza, A.R. et al., *Silicon Wafer Bonding For MEMS Manufacturing*, Solid State Technology, Aug. 1999, p. 73–78.

Moerman, I. et al., *A Review on Fabrication Technologies for the Monolithic Integration of Tapers with III–V Semiconductor Devices*; IEEE Journal of Selected Topics In Quantum electronics, vol. 3, No. 6, Dec. 1997, p. 1308–1320.

Müller, G. et al., *First Low Loss InP/InGaAsP Optical Switch with Integrated Mode Transformers*; ThC12.10; p. 37–40, no date.

Nayyer, J. et al., *Analysis of Reflection–Type Optical Switches with Intersecting Waveguides*, Journal of Lightwave Technology, vol. 6, No. 6, Jun. 1988; p. 1146–1152.

Negami, I. et al., *Guided–Wave Optical Wavelength Demultiplexer Using An Asymmetric Y Junction*; Appl. Phys. Lett. 54(12), Mar. 20, 1989, p. 1080–1082.

Nelson, W. et al., *Optical Switching Expands Communications–Network Capacity*, Laser Focus World, Jun. 1994, p. 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, vol. 6, No. 11, Nov 1994; p. 1332–1334.

Noda, Y. et al., *High–Speed Electroabsorption Modulator with Strip–Loaded GaInAsP Planar Waveguide*; Journal of Lightwave Technology, vol. LT–4, No. 10, Oct. 1986, p. 1445–1453.

Offrein, B.J. et al., *Resonant Coupler–Based Tunable Add–After–Drop Filter in Silicon–Oxynitride Technology for WDM Networks*, Journal of Selected Topics in Quantum Electronics, vol. 5—No. 5, 1400–1405, no date.

Okamoto, K. et al., *Arrayed–Waveguide Grating Mulitplexer With Flat Spectral Response*; Optics Letters, Jan. 1, 1995; vol. 20, No. 1; p. 43–45.

Okamoto, K. et al., *Flat Spectreal Response Arrayed–Waveguide Grating with Parabolic Waveguide Horns*, Electronics Letters Online, Jul. 15, 1996, No. 19961120, pp. 1661–1662.

Okayama, H. et al., *8×8 Ti:LiNbO₃ Waveguide Digital Switch Matrix*; IEICE Trans. Commun.; vol. E77–B, No. 2; Feb. 1944; p. 204–208.

Okayama, H. et al., *Dynamic Wavelength Selective Add/Drop Node Comprising Tunable Gratings, Electronics Letters Online*, Apr. 10, 1997, No. 19970607.

Okayama, H. et al., *Reduction of Voltage–Length Product for Y–Branch Digital Optical Switch*, Journal of Lightwave Technology, vol. 11. No. 2, Feb. 1993; p. 379–387.

Okuno, M. et al., *Strictly Nonblocking 16×16 Matrix Switch Silica Based Planar Lightwave Circuits*, vol. 10, No. 266, Sep. 11, 1986.

Ooba, N. et al., *Athermal Silica–Based Arrayed–Waveguide Grating Multiplexer Using Bimetal Plate Temperature Compensator*, Electronics Letters, Oct. 12, 2000, vol. 36, No. 21, pp 1800–1801.

Renaud, M. et al., *Compact Digital Optical Switches for Low Insertion Loss Large Switch Arrays on InP*; Proc. 21$^{st}$ Eur.Conf.on Opl.Comm. (ECOC '95–Brussels), p. 99–102.

Rickman, A.G. et al., *Silicon–on–Insulator Optical Rib Waveguide Loss and Mode Characteristics*, Journal of Lightwave Technology, Oct. 1994, vol. 12—No. 10, pp 1771–1776.

Rolland, C. et al., *10 Gbit/s, 1.56 μm, Multiquantum Well InP/InGaAsP Mach–Zehnder Optical Modulator*, Electronics Letters, Mar. 4, 1993, vol. 29, No. 5, p. 471–472.

Santec Sales Brochure for year 2000 entitled "Optical Components".

Schauwecker, B. et al, *Small–Size Silicon–Oxynitride AWG Demultiplexer Operating Around 725 nm*, IEEE Photonics Technology Letters, vol. 12 No. 12, Dec. 2000.

Schlachetzki, A. *Monolithic IO– Technology–Modulators and Switches Based on InP*; SPIE vol. 651, Integrated Optical Circuit Engineering III (1986), p. 60–86.

Silberberg, Y. et al., *Digital Optical Switch*; Appl. Phys. Lett; vol. 51, No. 16, Oct. 19, 1987, p. 152–154.

Smit, M.K., *New Focusing and Dispersive Planar Component Based on an Optical Phased Array*; Electronics Letters; Mar. 31, 1988, vol. 24, No. 7; p. 385–386.

Smith, S.D. et al., *CW Operation of Corner Cavity Semiconductor Lasers*; IEEE Photonics Technology Letters, vol. 5, No. 8, Aug. 1993; p. 876–879.

Sneh, A. et al., *Compact Low Crosstalk and Propagation Loss Quantum–Well Y–Branch Switches*; PDP 4–1–4–5, no date.

Soole, J.B.D. et al., *Use of Multimode Interference Couplers to Broaden the Passband of Wavelength–Dispersive Integrated WDM Filters*; IEEE Photonics Technology Letters, vol. 8, No. 10, Oct. 1996; p. 1340–1342.

Stoll, L. et al., *1:8 Optical Matrix Switch on InP/InGaAsP with Integrated Mode Transformers*; Optical Switches and Modulators II, p. 531–534, no date.

Stoll, L. et al., Compact and Polarization Independent Optical Switch on InP/InGaAsP; TuB7 2: p. 337–340, no date.

Stutius, W. et al., *Silicon Nitride Films On Silicon For Optical Waveguides*, Applied Optics, vol. 16, No. 12, Dec. 1977, p. 303–307.

Sugie, T. et al., *1–3–μm Laser Diodes with a Butt–jointed Selectively Grown Spot–Size Converter*, ThB2–6, IOOC95, p. 52–53.

Tada, K. et al., *Bipolar Transistor Carrier–Injected Opitcal Modulator/Switch: Proposal and Analysis*, IEEE Electron Device Letters, vol. EDL–7, No. 11, Nov 1986, p. 605–606.

Takada, et al., *Optical Spectrum analyzer using Cascaded AWG's with Different Channel Spacings*, Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resoultion*, PWG–NTT–7, no date.

Takiguchi, K. et al, *Dispersion Compensation Using a Planar Lightwave Circuit Optical Equalizer*, Photonics Technology Letters, Apr. 1994, vol. 6, No. 4, pp. 561–564.

Tien, P.K. et al., *Formation of Light–Guiding Interconnections in an Integrated Optical Circuit by Composite Tapered–Film Coupling*; Applied Optics, vol. 12, No. 8, Aug. 1973; p. 1909–1916.

Toyoda et al., *Thermoplastic Switch and Wavelength Tunable Filter using Polymer Waveguides*, Abstract of paper presented at Opticomm 2001 on Aug. 22, 2004.

Treyz G.V. et al., *Silicon Optical Modulators at 1.3 μm Based on Free–Carrier Absorption*; IEEE Electron Device Letters, vol. 12, No. 6, Jun. 1991; p. 276–278.

Tsuda, H. et al., *Performance Analysis of a Dispersion Compensator Using Arrayed–Waveguide Gratings*, Journal of Lightwave Technology, Aug. 2000, vol. 18—No.8, pp 1139–1147.

Tsude, H. et al., *Second– and Third–Order Dispersion Compensator Using a High–Resolution Arrayed Waveguide Grating*, IEEE Photonics Technology Letters, May 1999, vol. 11—No. 5, 569–571.

Vinchant et al, *InP 4×4 Digital–Optical–Switch Module For Multiwavelength Cross–Connect Applications*; OFC '95 Technical Digest, Thursday ThK2, p. 281–282.

Vinchant, J.F. et al., *First Polarisation Insensitive 4×4 Switch matrix on InP with Digital Optical Switches*, TuB7.3, p. 341–344, no date.

Vinchant, J.F. et al., *InP Digital Optical Switch: Key Element for Guided–Wave Photonic Switching*; IEE Proceedings J, vol. 140, No. 5, Oct. 1993; p. 301–307.

Vinchant, J.F. et al., *Low Driving Voltage or Current Digital Optical Switch on InP for Multiwavelength System Applications*; Electronics Letters, vol. 28, No. 12, Jun. 4, 1992; p. 1135–1137.

Wakita, K. et al., *Long Wavelength Waveguide Multiple Quantum Wall Optical Modulators*; IEEE Journal of Quantum Electronics, vol. QE–23, No. 12, Dec. 1987, p. 2210–2215.

Wanru, Z. et al., *Total Internal Reflection Optical Switch with Injection Region Isolated by Oxygen Ion Implantation*; p. 1–10, no date.

Yamada, et al., *Cross Talk Reduction in a 10 GHz Spacing Arrayed–Waveguide Grating by Phase–Error Compensation*, Journal of Lightwave Technology, Mar. 1998, vol. 16—No. 3, pp. 364–371.

Yanagawa, H. et al., *Polarization–and Wavelength–Insensitive Guided–Wave Optical Switch with Semiconductor Y Junction*; Journal of Lightwave Technology, vol. 8, No. 8, Aug. 1990, p. 1192–1197.

Yu, S. et al., *High Speed All–Optical Packet Rounting Using A Vertical Coupler Crosspoint Space Switch*, no date.

Yu, S. et al., *Ultralow Cross–Talk, compact integrated optical crosspoint space switch arrays employing active InGaAsP/InP Vertical Waveguide Couplers*, Integrated Optical Crosspoint Switch Arrays, Siyuan Yu et a, CPD24–2, no date.

Zengerle, R. et al., *Tapered Twin Waveguides For Spot–Size Transformation In InP*; TheB2–5; IOOC 95: p. 50–51.

Zirngibl, M. et al., *Digitally Tunable Laser Based On The Integration Of A Waveguide Grating Multiplexer And An Optical Amplifier*, IEEE Photonics Technology Letters, Apr. 1994, vol. 6—No. 4, pp. 516–517.

Zucker, J.E. et al., *Strained Quantum Wells for Polarization–Independent Electrooptic Waveguide Switches*, Journal of Lightwave Technology, vol. 10, No. 12, Dec. 1992, p. 1926–1930.

Lin, et al., *Detector Array Packaging Technology for PLCs and its Application in WDM Subsystems*, 1999 IEEE, 65–68.

Van Der Linden, et al., *High–Density and Alignment–Tolerant Integration of Monitoring Photodetector Arrays onto Polymeric Guided–Wave Components*, IEEE Transactions on Advanced Packaging, vol. 22, No. 4, Nov. 1999, pp 534–540.

Koren, et al., *A 1.3–mm Wavelength Laser with and Integraed Output Power Monitor Using a Directional Coupler Optical Power Tap*, IEEE Photonics Technology Letters, vol. 8, No. 3, Mar. 1996, pp. 364–366.

Ohyama, et al., *8–Channel × 2.5 Gbit/s Hybrid Integrted Multiwavelength Phtoreceiver Module with Arrayed–Waveguide Grating Demultiplexer*, Electronics Letters, 25th Apr. 2002, vol. 38, No. 9, pp 419–422.

Pennings, et al., *Integrated–Optic ersus Microoptic Devices for Fiber–Optic Telecommunication Systems: A Comparison*, IEEE journal of Selected Topics in Quantum Electronics, vol. 2, No. 2, Jun. 1996, pp. 151–164.

* cited by examiner

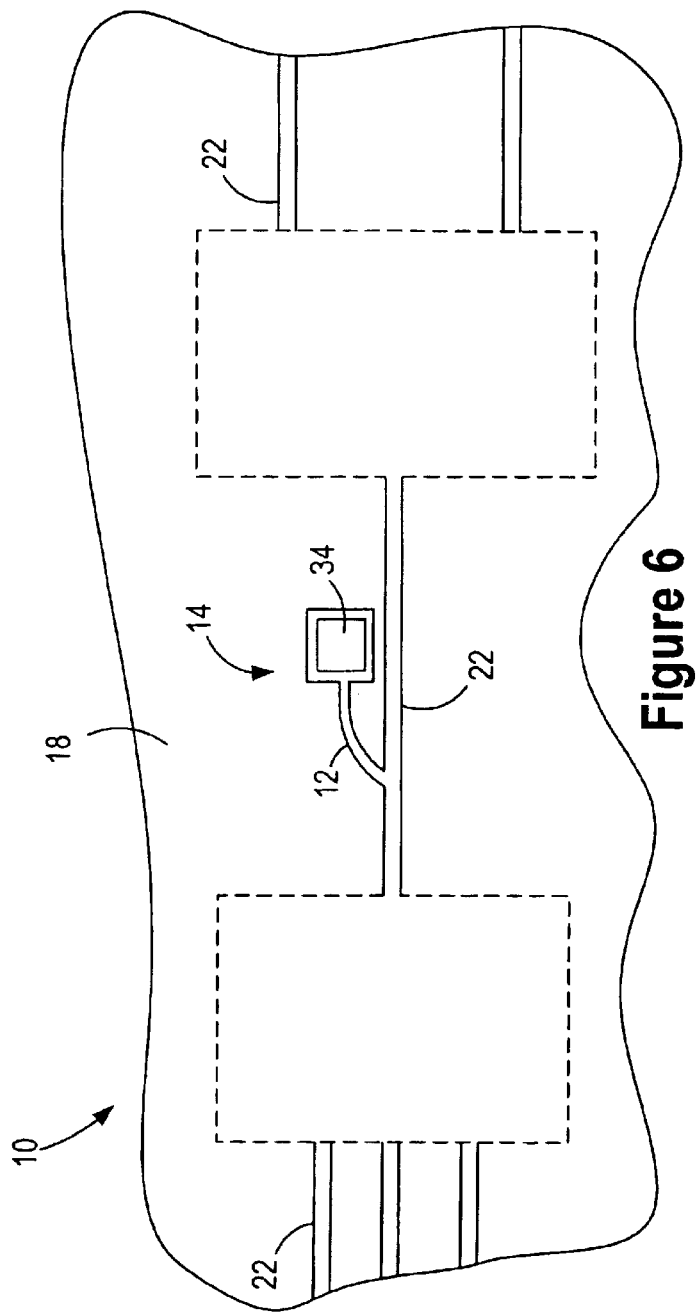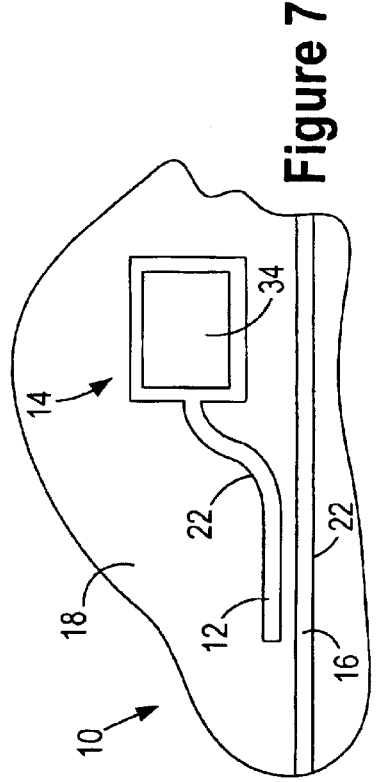

WAVEGUIDE TAP MONITOR

BACKGROUND

1. Field of the Invention

The invention relates to optical components having waveguide taps. In particular, the invention relates to waveguide taps having a light sensor for monitoring light signals on waveguide.

2. Background of the Invention

A variety of optical components include one or more waveguides where light signals are constrained. These optical components can include one or more tap waveguides. A tap waveguide extracts a portion of the light signal traveling along a primary waveguide. A light sensor is positioned to receive the light signals traveling along the tap waveguide. Because the tap waveguide carries a portion of the light signal traveling along the primary waveguide, the output of the light sensor indicates characteristics of the light signal on the primary waveguide. As a result, the light sensor is monitored to sample the light signals traveling along the primary waveguide.

The tap waveguide typically ends at the edge of an optical component. The light sensor is positioned at the edge of the optical component over the end of the tap waveguide. As a result, the light sensor receives the light signals directly from the tap waveguide. As the complexity of optical circuits formed on optical chips increases, many tap waveguides can not be terminated at an edge of an optical component. As a result, the prior art taps can often not be employed with complex optical circuits. Hence, there is a need for a waveguide tap that is suitable for use with complex optical circuits.

Many tap waveguide arrangements are associated with an undesirably high level of polarization dependent loss. Polarization dependent loss is a result of different polarization modes traveling from the primary waveguide to the light sensor differently. As a result, the relative powers of the polarization modes received by the light sensor is often not representative of the relative powers of the polarization modes in the primary waveguide. Because the distribution of polarity modes received by the light sensor is often not representative, the output of the light sensor can provide poor results when used to monitor an optical component. Accordingly, there is a need for a tap waveguide arrangement where output of the light sensor represents the conditions in the primary waveguide.

SUMMARY OF THE INVENTION

The invention relates to an optical component. The optical component includes a tap waveguide and a primary waveguide positioned on a base. The tap waveguide is configured to receive a portion of a light signal traveling along the primary waveguide. The portion of the light signal received by the tap waveguide is the tapped portion of the light signal. A direction changing region is configured to receive the tapped portion of the light signal from the tap waveguide and to redirect the tapped portion of the light signal such that the tapped portion of the light signal travels away from the base. A light sensor is configured to receive the tapped portion of the light signal from the direction changing region.

The direction changing region can be configured to direct the tapped portion of the light signal away from the base at an angle greater than 150°, 300°, 450°, 60° or 75° and angles in the range of 10° to 170°, 30° to 150°, 60° to 120° or 75° to 95° measured relative to the base. In some instances, the direction changing region is configured to direct the tapped portion of the light signal away from the base at an angle greater than 15°, 30°, 45°, 60° or 75° and angles in the range of 10° to 170°, 30° to 150°, 60° to 120° or 75° to 95° measured relative to the plane.

In another embodiment of the optical component, the direction changing region is configured to direct the tapped portion of the light signal out of a plane defined by a direction of light signal propagation along the tap waveguide and a direction of light signal propagation along the primary waveguide. The direction changing region can be configured to direct the tapped portion of the light signal away from the plane at an angle greater than 50°, 30°, 45°, 60° or 75° and angles in the range of 10° to 170°, 30° to 150°, 60° to 120° or 75° to 95° measured relative to the base.

In some instances, the direction changing region is constructed such that the tapped portion of the light signal is refracted at an angle φ upon entering the direction changing region where the angle φ is measured relative to the direction of propagation of the tapped portion along the tap waveguide at the interface of the tap waveguide and the direction changing region. The angle φ can be at least 2°, 7°, 15° or 25°.

Another embodiment of the optical component includes a tap waveguide configured to receive a portion of a light signal traveling along a primary waveguide. The portion of the light signal received by the tap waveguide is the tapped portion of the light signal. A light is sensor configured to receive the tapped portion of the light signal from the tap waveguide. A light absorbing medium is positioned adjacent to the tap waveguide so as to absorb one polarity mode of the tapped portion more than another polarity mode of the tapped portion.

In some instances, the light absorbing medium is configured to absorb the $T_E$ polarity mode more than the $T_M$ polarity mode. The light absorbing medium can be arranged such that the fraction of the tapped portion traveling in the $T_E$ polarity mode and the fraction of the tapped portion traveling in the $T_M$ polarity mode is about even at the light sensor. The invention also relates to a method of operating an optical component. The method includes receiving in a tap waveguide a portion of a light signal traveling along a primary waveguide. The portion of the light signal received by the tap waveguide is the tapped portion of the light signal. The method also includes directing the tapped portion of the light signal such that the tapped portion of the light signal travels away from the base and receiving the tapped portion of the light signal at a light sensor.

BRIEF DESCRIPTION OF THE FIGURES.

FIG. 6 illustrates an optical component having a tap waveguide positioned between optical devices.

FIG. 7 illustrates a coupler arranged such that a portion of the light signal traveling along a primary waveguide enters the tap waveguide.

DETAILED DESCRIPTION

The invention relates to an optical component. The optical component includes a tap waveguide and a primary waveguide positioned on a base. The tap waveguide is configured to receive a portion of a light signal traveling along the primary waveguide. The portion of the light signal received by the tap waveguide is the tapped portion of the light signal. The tap waveguide includes a direction changing region that receives the tapped portion of the light signal from the tap waveguide. The direction changing region redirects the tap portion such that the tapped portion travels signals away from the base.

A light sensor located over the direction changing region is positioned to receive the re-directed light signals. Because the light sensor can be positioned over the tap waveguide, the light sensor can be centrally positioned on the optical component. As a result, the light sensor need not be positioned at an edge of the optical component and is suitable for use with complex optical circuits.

The tap waveguide can include a light absorbing medium arranged so as to absorb one polarity mode of the tapped portion more than another polarity mode of the tapped portion. For instance, the light absorbing medium can be arranged so as to absorb the $T_E$ polarity mode more than the $T_M$ polarity mode. As a result, the light absorbing medium can be arranged such that the tapped portion has a particular ratio of the $T_E$ polarity mode to the $T_M$ polarity mode at the light sensor. Hence, the light absorbing medium can be employed to compensate for polarization dependent loss associated with the tap waveguide. For instance, the light absorbing medium can be arranged such that the ratio of the $T_E$ polarity mode to the $T_M$ polarity mode at the light sensor approximates the ratio in the primary waveguide. When the light absorbing medium is configured such that ratio at the light sensor approximates the ratio in the primary waveguide, the light sensor output approximates the output that would result if the light sensor received the light signal directly from the primary waveguide.

Figure 1A:
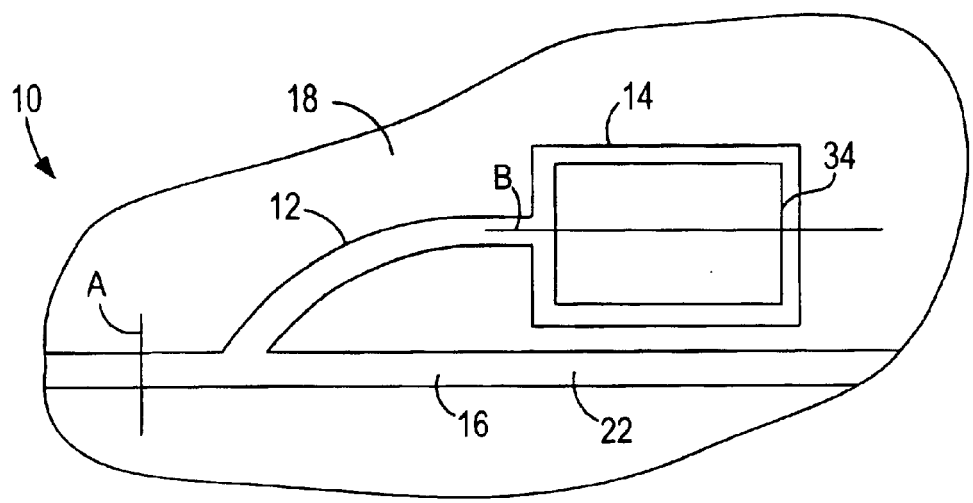
FIG. 1A is a topview of an optical component having a primary waveguide and a tap waveguide positioned on a base. The tap waveguide includes a direction changing region configured to direct light signals traveling along the tap waveguide away from the base toward a light sensor.
Figure 1B:
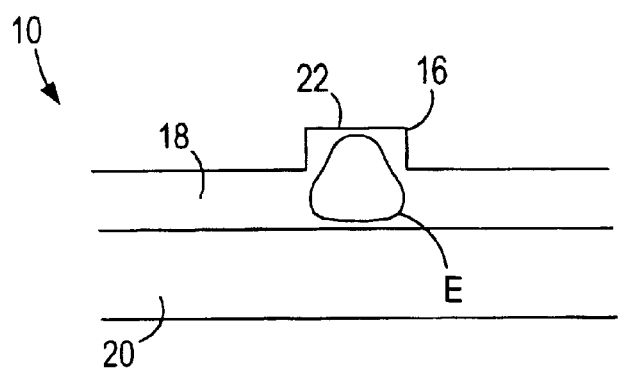
FIG. 1B is a cross section of the optical component shown in FIG. 1A taken at the line labeled A.
Figure 1C:
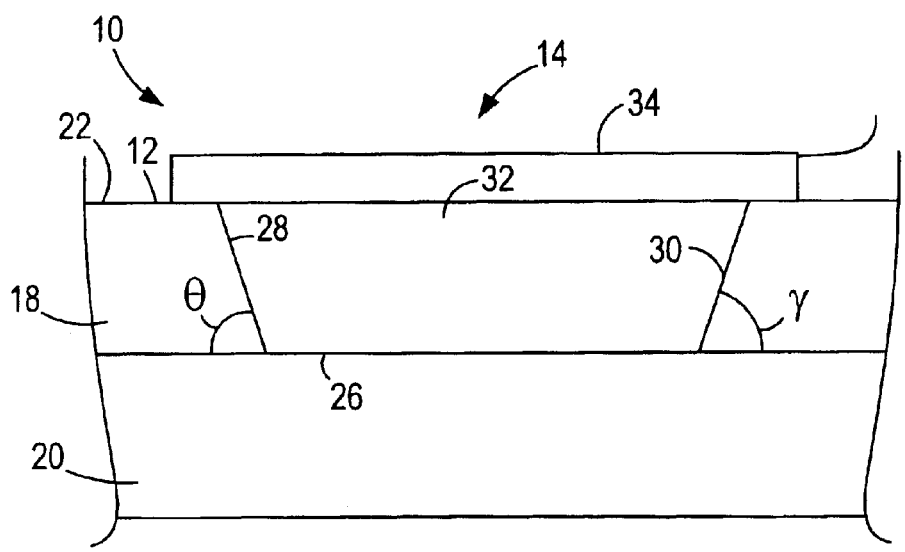
FIG. 1C is a cross section of the optical component shown in FIG. 1A taken at the line labeled B.

FIG. 1A through FIG. 1C illustrate an optical component 10 having a tap waveguide 12 that includes a direction changing region 14. FIG. 1A is a topview of the optical component 10. FIG. 1B is a cross section of the optical component 10 taken at the line labeled A and FIG. 1C is a cross section of the optical component 10 taken at the line labeled B.

The optical component 10 includes primary waveguide 16 and a tap waveguide 12 defined in a first light transmitting medium 18 positioned on a base 20. The first light transmitting medium 18 includes a ridge 22 that defines an upper portion of the waveguides. Suitable light transmitting media include, but are not limited to, silicon, polymers, silica, SIN, GaAs, InP and LiNbO$_3$. The portion of the base 20 adjacent to the first light transmitting medium 18 includes a medium that reflects light signals from the waveguide back into the waveguide. As a result, the base 20 defines a lower portion of the waveguides. The line labeled E illustrates the profile of a light signal carried in a waveguide.

The tap waveguide 12 includes a direction changing region 14. The direction changing region 14 includes one or more sides. The illustrated embodiment includes a bottom side 26 and a plurality of lateral sides including a leading side 28 and a following side 30. The direction changing region includes a second light transmitting medium 32. The second light transmitting medium 32 has a different index of refraction than the first light transmitting medium 18. Suitable second light transmitting media include, but are not limited to, air, epoxy and polymers. An example of a suitable polymer is Polyimide P12611 that is not a substantial source of stress for an optical component 10 constructed from a silicon-on-insulator wafer.

As is illustrated in FIG. 1C, the leading side 28 can be positioned at an angle θ measured relative to the base 20 and the following side 30 can be positioned at an angle γ measured relative to the base 20. The angle θ can be the same or different from the angle γ. A suitable range of angles for θ and/or γ includes, but is not limited to, angles in the range from 0° to 90°, and 45° to 90° and angles less than 89°, 87° or 85°.

A light sensor 34 is positioned adjacent to the direction changing region 14. Suitable light sensors 34 include, but are not limited to, one or more photodetectors, one or more photodiodes and one or more avalanche photodiodes, charge coupled devices (CCDs), and photomultiplier tubes. A specific example of a light sensor 34 is an InGaAs PIN detector. Although not illustrated, a layer of adhesive can be positioned between the light sensor and the direction changing region in order to immobilize the light sensor relative to the direction changing region.

Figure 1D:
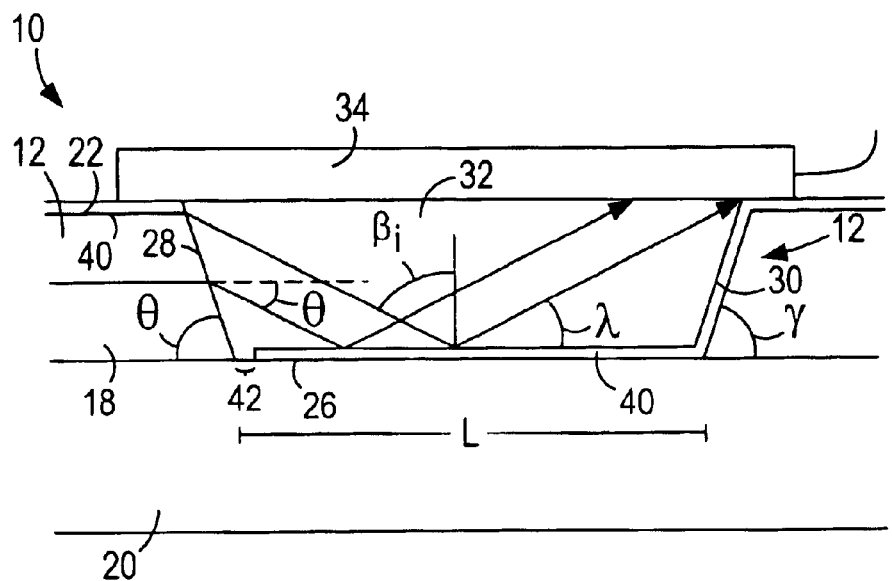
FIG. 1D illustrates operation of the optical component shown in FIG. 1A.

FIG. 1D illustrates operation of the optical component 10. As a light signal traveling along the primary waveguide 16 passes the tap waveguide 12, a portion of the light signals enters the tap waveguide 12. The portion of the light signal that enters the tap waveguide 12 is referred to as the tapped portion. The tapped portion travels along the tap waveguide 12 and enters the direction changing region 14 through the leading side 28. The direction changing region 14 is constructed so as to refract the tapped portion toward one or more of the sides.

The one or more sides that receive the tapped portion serve as reflecting surfaces that reflect the refracted portion toward the light sensor 34. In the illustrated embodiment, the bottom side 26 serves as a reflecting surface that reflects the tapped portion. The angle of incidence of the tapped portion is illustrated by the angle labeled $\beta_i$. The tapped portion is reflected at an angle α measured relative to the direction of propagation of light signals along the tap waveguide 12. Accordingly, the direction changing region redirects the tapped portion of the light signal such that the tapped portion of the light signal travels away from the base 20. Further, when a plane is defined by the direction of propagation of the light signal along the tap waveguide 12 and the primary waveguide 16, the direction changing region 14 redirects the tapped portion of the light signal such that that the tapped portion of the light signal travels out of the plane at an angle α. The light sensor 34 is position to receive the tapped portion reflected by the one or more reflecting surfaces.

Suitable angles for α include, but are not limited to, angles greater than 0°, 30°, 45°, 60° or 75° and angles in the range of 10° to 170°, 30° to 150°, 60° to 120° or 75° to 95°. Suitable angles for the tapped portion to travel away from the base 20 include, but are not limited to, angles greater than 0°, 30°, 45°, 60° or 75° and angles in the range of 10° to 170°, 30° to 150°, 60° to 120° or 75° to 95°. When a plane is defined by the direction of propagation of the light signal along the tap waveguide 12 and the primary waveguide 16, a suitable angle for the tapped portion of the light signal to travel out of the plane includes, but is not limited to, angles greater than 0°, 30°, 45°, 60° or 75° and angles in the range of 10° to 170°, 30° to 150°, 60° to 120° or 75° to 95°.

As illustrated in FIG. 1D, the direction changing region 14 is configured to refract the tapped portion an angle φ measured relative to the direction of propagation of the light signals along the tap waveguide 12. The angle φ is a function of the angle θ and the difference in the index of refraction between the first light transmitting medium 18 and the second light transmitting medium 32. For instance, increasing the angle θ results in a lower angle φ. Additionally, when the index of refraction of the second light transmitting medium 32 is reduced, the angle φ increases. As a result, the direction changing region 14 is constructed with an angle θ and a second light transmitting medium 32 that produce the desired angle φ.

Figure 1E:
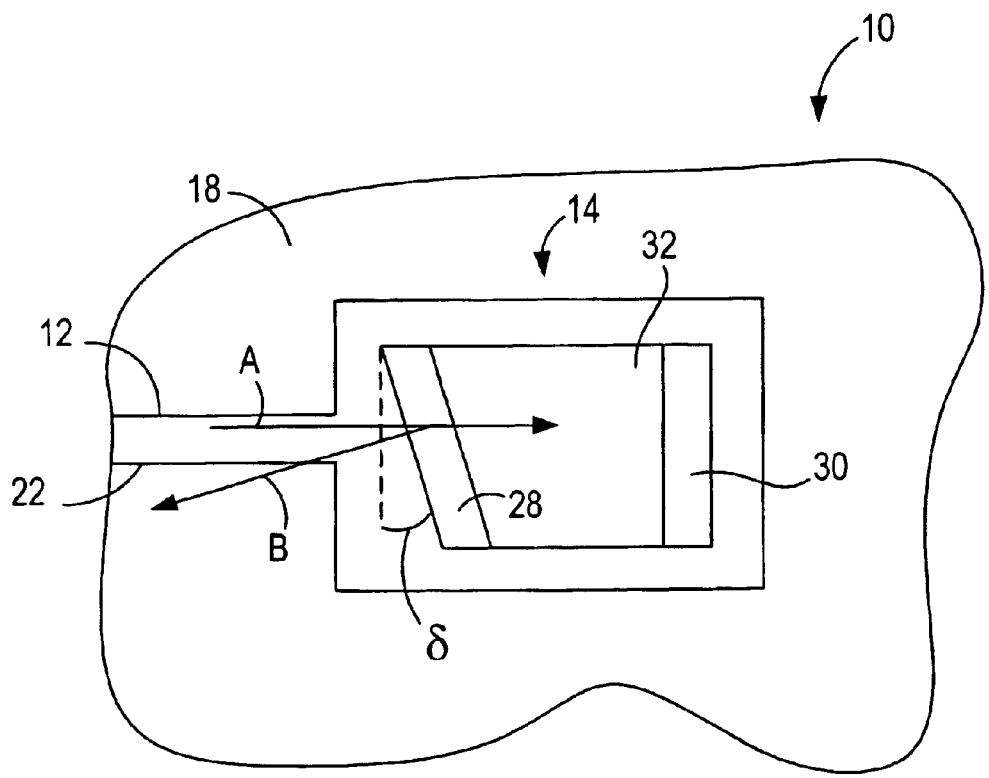
FIG. 1E is a topview of a direction changing region having a leading side angled so as to direct reflected portions of a light signal out of the tap waveguide.

In some instances, the leading side is angled so direct reflected portions of the tapped light signal out of the tap waveguide and/or out of the direction changing region 14. For instance, FIG. 1E is a topview of a direction changing region 14 without the light sensor. The leading side 28 is positioned at an angle δ measured relative to a plane that is perpendicular to the base and perpendicular to the longitudinal axis of the tap waveguide 12 at the leading side 12. Accordingly, in some instances, the leading side 28 can be positioned at an angle θ measured relative to the base and at an angle δ measured relative to a plane perpendicular to the base. As illustrated by the arrow labeled A, a portion of the light signal is transmitted through the leading side 28 and a portion of the light signal is reflected by the leading side 28. The angle δ can be selected such that the reflected portion of the light signal is reflected out of the tap waveguide 12 and/or out of the direction changing region 14 as illustrated by the arrow labeled B rather than being reflected back into the tap waveguide 12. The angle δ can be greater than 0° or greater than 1°. Suitable angles for the angle δ include, but are not limited to, angles in the range of 0° to 45°, 1° to 15°, 2° to 9° or 3° to 8°. The choice of the angle δ can be function of the optical component construction. For instance, a suitable angle δ can be different for different combinations of the light transmitting medium 18 and the second light transmitting medium 32. In some instances, the angle θ will be sufficient to direct the reflected portion out of the tap waveguide 12 and an angle δ of 0° is suitable.

Figure 2A:
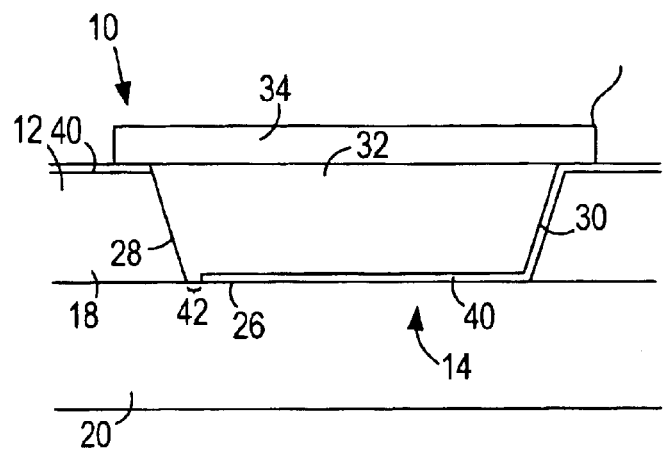
FIG. 2A illustrates a direction changing region including a reflective layer configured to reflect light signals from the tap waveguide.

The direction changing region 14 can include a reflective layer 40 as illustrated in FIG. 2A. The reflective layer 40 is formed on at least one of the reflecting surfaces but is not formed on the transmission surface. The reflective layer 40 can also optionally be formed between the light sensor 34 and the first light transmitting medium 18. The reflective layer 40 can serve to provide more reflection than would be provided by the base. A suitable reflective layer 40 includes, but is not limited to, metals such as aluminum.

The reflective layer 40 can be positioned in contact with a portion of the leading side 28. Alternatively, the reflective layer 40 can be spaced apart from the leading side 28 as illustrated in FIG. 2A.

Figure 2B:
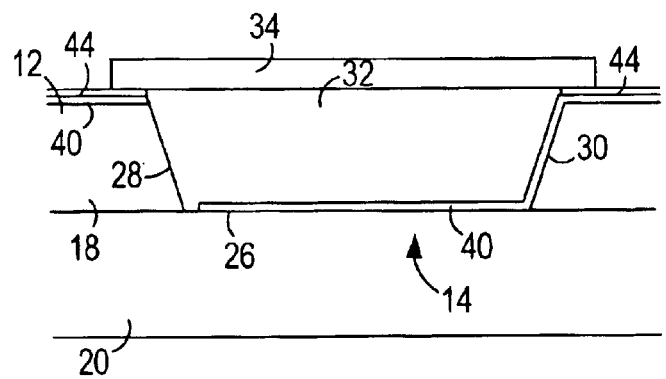
FIG. 2B illustrates a direction changing region including an anti reflective coating positioned over a reflective layer.

An anti reflective coating 44 can be positioned between the light sensor 34 and the direction changing region 14. For instance, the anti reflective coating 44 can be positioned between the reflective layer 40 and the light sensor 34 as illustrated in FIG. 2B. In some instances, the anti reflective coating 44 can serve to increase the responsivity of the light sensor 34. A suitable anti reflective coating 44 includes, but is not limited to, $Si_3N_4$.

Figure 3:
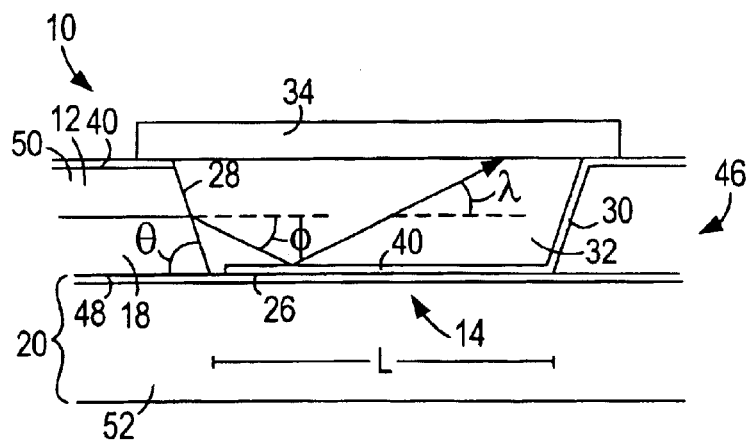
FIG. 3 is a specific example of a direction changing region constructed in accordance with FIG. 2A.

FIG. 3 provides a specific example of a direction changing region 14 constructed according to FIG. 2A. The optical component 10 is constructed from a silicon-on-insulator wafer 46. A silicon-on-insulator wafer 46 typically includes a silica layer 48, positioned between a silicon layer 50 and a silicon substrate 52. The silicon layer 50 serves as the first light transmitting medium 18. The silica layer 48 and the silicon substrate 52 serve as the base 20. The silica layer 48 serves as a light barrier that reflects light signals from the first light transmitting medium 18 back into the first light transmitting medium 18. An aluminum reflective layer 40 is positioned on at least the bottom side 26 and on the following side 30. When the second light transmitting medium 32 is air with an index of refraction of about 1 and the leading side 28 is constructed with an angle θ of about 84°, the tapped portion is refracted at an angle φ of about 15.5° and is reflected so as to travel away from the optical component at an angle α of about 15.5°. When the second light transmitting medium 32 is polyimide PI2611 which has an index of refraction of about 2.9 and the leading side 28 is construed with an angle θ of about 54.7°, the tapped portion is refracted at an angle φ of about 8.9° and is reflected at an angle a of about 8.9°. When the second light transmitting medium 32 is epoxy with an index of refraction of about 1.5 and the leading side 28 is construed with an angle θ of about 84°, the tapped portion is refracted at an angle φ of about 6.1° and is reflected at an angle a of about 6.10°.

The length of the bottom side 26 can be selected such that the bottom side 26 receives substantially the entire tapped portion. As a result, the bottom side 26 can serve as the only reflecting surface. For instance, when the ridge 22 has a height of 1.9μ m and the height of the ridge 22 above the silica layer 48 is about 5 μ m, a suitable length for the bottom side 26 is about 64 μ m. When the bottom side 26 serves as the only reflecting surface, the length, L, of the direction changing region can be reduced as the angle a approaches 90°. Decreasing the length, L, of the direction changing region can reduce the chip space required by the direction changing region 14.

As noted above, an adhesive can be positioned between the light sensor and the direction changing region. Many adhesives will have a thickness greater than the thickness of the first light transmitting medium. As a result, the adhesive can increase the distance between a reflecting surfaces and the light sensor. Increasing this distance increases the distance that the tapped portion of the light signal travels after being reflected. As a result, the light sensor often must be sized or positioned so as to compensate for the additional distance. For instance, the length and width of the light sensor can be larger than the length, L, that is required for the direction changing region.

Figure 4A:
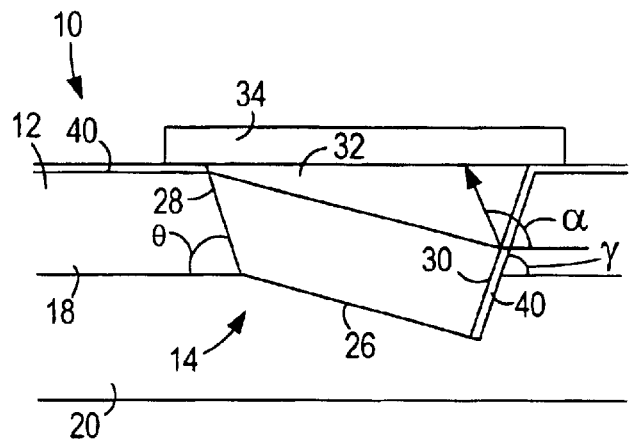
FIG. 4A illustrates a direction changing region arranged such that light signals travel from a leading side to a following side. The following side reflects the light signals toward a light sensor.

Sides other than the bottom side 26 can be used as the reflecting surface. For instance, FIG. 4A illustrates the following side 30 configured to serve as a reflecting surface. During operation of the direction changing region 14, the tapped portion travels from the leading side 28 to the following side 30. The following side 30 is constructed with an angle γ that reflects the tapped portion of the light signals toward the light sensor 34. Suitable angles γ include, but are not limited to, angles in the range from 0° to 90°, and 45° to 90°.

The following side 30 can optionally extend into the base 20 as illustrated in FIG. 4A. Because the tapped portion of the light signal is generally refracted toward the base 20, extending the following side 30 into the base 20 can increases the portion of the light signal that is reflected off the following side 30. Further, all or a portion of the bottom side 26 can extend into the base 20. For instance, FIG. 4A illustrates the bottom side 26 as being sloped into the base 20. The bottom side 26 extends further into the base 20 moving from the leading side 28 to the following side 30. When the tapped portion of the light signal is refracted toward the base 20, this slope configuration reduces the portion of the light signal that is reflected by the base 20 before reaching the following side 30.

Figure 4B:
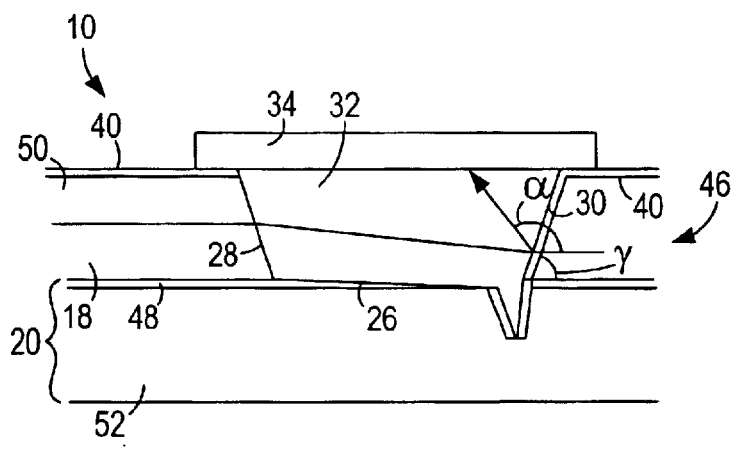
FIG. 4B illustrates the optical component of FIG. 4A constructed on a silicon-on-insulator wafer. The bottom side extends into the base.

FIG. 4B illustrates a direction changing region 14 according to FIG. 4A constructed on a silicon-on-insulator wafer 46. The bottom side 26 slopes into the silica layer 48. Additionally, the angle, γ, is lower in the silicon substrate 52 than in the silicon. When the angle θ is 84°, the angle γ is 35.3 and the second light transmitting medium 32 is air, the light signals are reflected at an angle α of about 124.9°.

Figure 4C:
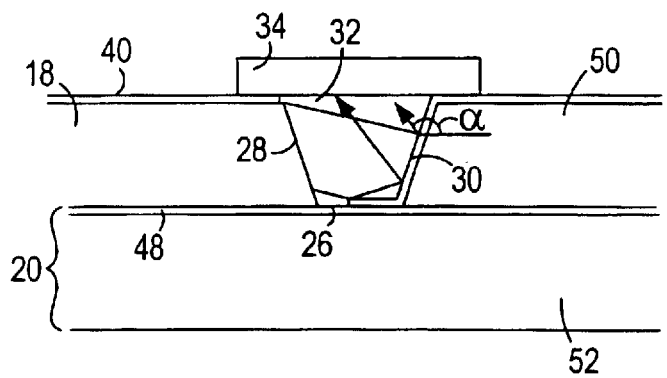
FIG. 4C illustrates the optical component of FIG. 4A constructed on a silicon-on-insulator wafer. The bottom side does not extend into the base.

The bottom side need not be sloped. For instance, FIG. 4C illustrates a direction changing region 14 according to FIG. 4A constructed on a silicon-on-insulator wafer 46 and having a flat bottom side. As illustrated by the arrows, a portion of the tapped light signal is reflected by both the bottom side 26 and the following side 30 before being received by the light sensor.

Figure 5A:
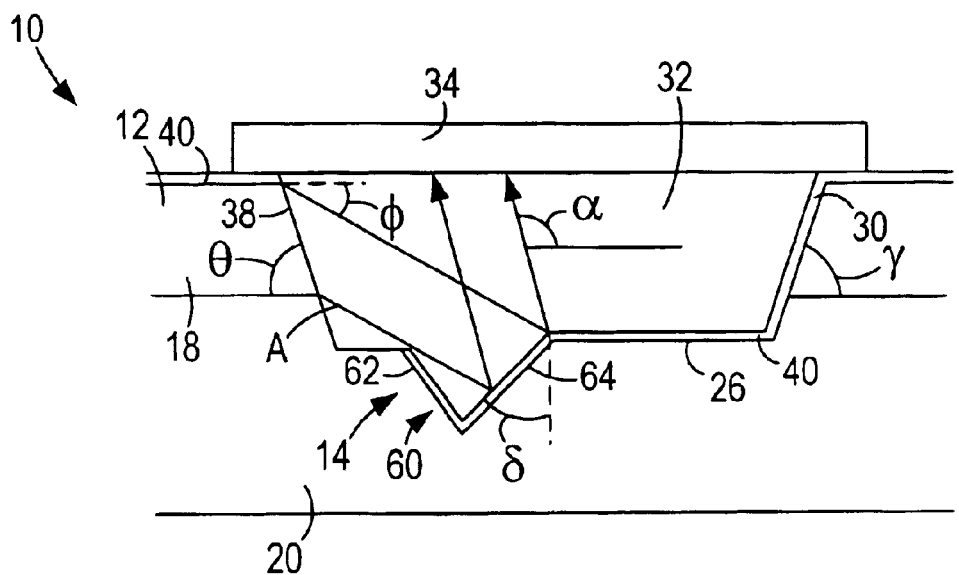
FIG. 5A illustrates a direction changing region arrange such that light signals travel from a leading side into a recess formed in the bottom of the direction changing region. The recess includes a side configured to reflect the light signals toward a light sensor.

The direction changing region 14 can include other sides configured to reflect the tapped portion of the light signal toward the light sensor 34. For instance, FIG. 5A illustrates the bottom side 26 including a recess 60 configured to reflect the tapped portion of the light signal toward the light sensor 34. The recess 60 includes a first side 62 and a second side 64. During operation of the direction changing region 14, the tapped portion of the light signal is refracted toward the second side 64 of the recess 60. The second side 64 is positioned at an angle δ that reflects the tapped portion of the light signals toward the light sensor 34.

The leading side 28 can optionally extend into the base 20 as illustrated in FIG. 5A. Extending the leading side 28 into the base 20 can reduce the portion of the light signal that is reflected by the bottom side 26 before reaching the second side 64. The line labeled A illustrates this principle. If the leading side 28 did not extend into the base 20, the line labeled A would be reflected by the base 20 before being reflected off the second side 64.

Figure 5B:
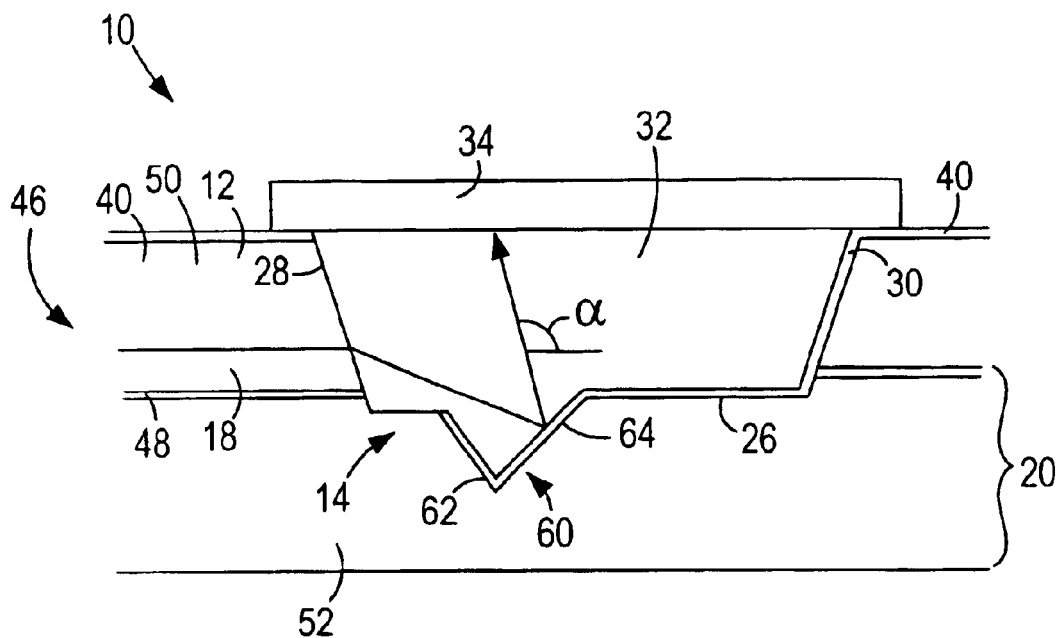
FIG. 5B illustrates the optical component of FIG. 5A constructed on a silicon-on-insulator wafer.

FIG. 5B illustrates a direction changing region 14 according to FIG. 5A constructed on a silicon-on-insulator wafer 46. When the angle θ is 84°, the angle δ is 35.3 and the second light transmitting medium 32 is air, the light signals are reflected so as to travel away from the optical component at an angle α of about 124.9°.

Although FIG. 5A and FIG. 5B illustrate the second side 64 being spaced apart from the following side 30, the second side 64 can be continuous with the following side 30.

As is evident above, the direction changing region 14 redirects the tapped portion such that the tapped portion travels away from the base 20. This re-direction allows the light sensor 34 to be positioned above the tap waveguide 12 as shown in FIG. 1D. Because the light sensor 34 is positioned over the tap waveguide 12, the light sensor 34 need not be positioned at an edge of the optical component 10 and can be centrally positioned on the optical component 10. The ability to centrally position the light sensor 34 on the optical component is suitable for use with more complex optical circuit designs. For instance, FIG. 6 is a topview of an optical component 10 having a tap waveguide positioned between devices. Examples of devices include, but are not limited to, demultiplexers, multiplexers, filters, switches amplifiers, star couplers, etc. The dashed lines illustrate the locations of the devices on the optical component. Because the light sensor can be positioned between devices, the performance of the optical devices can be measured independently.

Although FIG. 1A illustrates the tap waveguide 12 as being directly tapped into the primary waveguide 16, other tap arrangements are possible. For instance, FIG. 7 is a topview of an optical component 10 that employs a coupler in order to divert a portion of the light signal in a primary waveguide 16 to a tap waveguide 12.

Different polarity modes often travel from the primary waveguide 16 to the tap waveguide 12 differently. As a result, the transition from the primary waveguide to the tap waveguide 12 is often a source of polarization dependent loss (PDL). Additionally, transmission of the tapped portion of the light signal through the leading side 28 can be a source of PDL. The amount of PDL caused by the transmission is often a function of the angle θ. Further, reflection of the tapped portion of the light signal off a reflective layer 40 can also be a source of PDL. The amount of PDL caused by the reflection is often a function of the angle of incidence.

The direction changing region 14 can be constructed so as to eliminate or reduce the effects of PDL. For instance, the transition from the primary waveguide 16 to the tap waveguide 12 and the transmission of the tapped portion through the leading side 28 are generally associated with a larger loss of the $T_M$ mode than of the $T_E$ mode while reflection off a reflective layer 40 is generally associated with a larger loss of the $T_E$ mode than of the $T_M$ mode. As a result, the direction changing region 14 can be constructed such that PDL associated with reflection(s) off the reflective layer 40 compensates for PDL from the other sources.

Figure 8B:
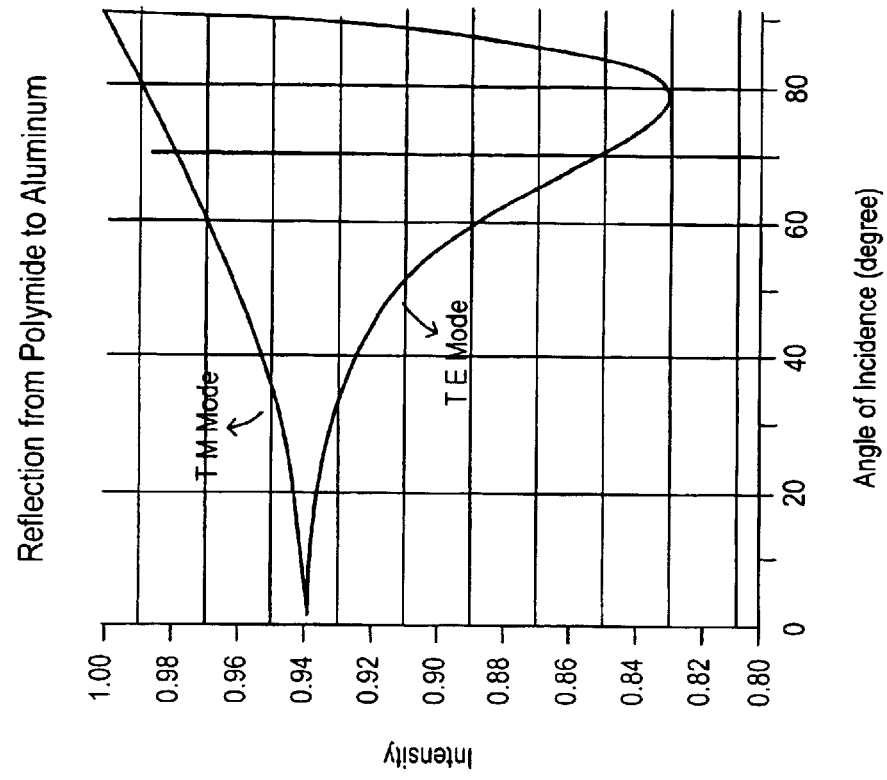
FIG. 8A and FIG. 8B illustrate PDL characteristics for a direction changing region constructed according to FIG. 3.
Figure 8A:
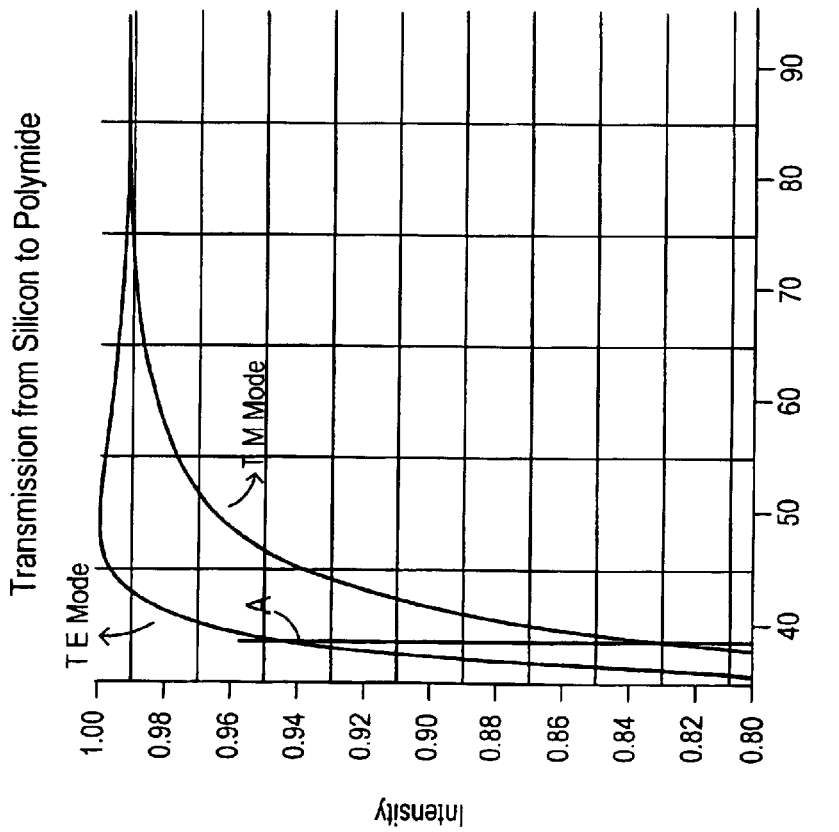

FIG. 8A and FIG. 8B illustrate data that is suitable for designing a direction changing region 14 so as to compensate for PDL associated with the tap waveguide 12 and the direction changing region 14. FIG. 8A and FIG. 8B illustrate PDL characteristics for a direction changing region 14 constructed according to FIG. 3 where the first light transmitting medium 18 is silicon, the second light transmitting medium 32 is polyimide and the reflective layer 40 is aluminum. FIG. 8A illustrates the scaled intensity of the $T_M$ mode and the $T_E$ mode after transmission through the leading side 28 versus the angle θ of the leading side 28. For the purposes of FIG. 8A, the scaled intensity of a mode is the intensity of that mode scaled against the intensity of the mode before transmission through the leading side 28. FIG. 8B illustrates the scaled intensity of the $T_M$ mode and the $T_E$ mode after reflection off the reflective layer 40. For the purposes of FIG. 8B, the scaled intensity of a mode is the intensity of that mode scaled against the intensity of that mode before reflection.

If transmission through the leading side 28 and reflection off the reflective layer 40 are the only sources of PDL associated with the tap waveguide 12 and the direction changing region 14, FIG. 8A and FIG. 8B can be employed to design a direction changing region 14 associated with a reduced level of PDL. For instance, FIG. 8A and FIG. 8B can be employed to determine the net scaled intensity of each mode after reflection off the reflective layer 40. The net scaled intensity is the intensity at the light sensor 34 scaled by the intensity of each light signal before each source of PDL associated with the tap waveguide 12 and the direction changing region 14. When the transition from the primary waveguide to the tap waveguide is associated with polarization dependent loss, the net scaled intensity can be scaled by the intensity of the most intense mode after the transition. In the specific case associated with FIG. 8A and FIG. 8B, the net scaled intensity of a mode is the intensity of the mode after the mode is transmitted through the leading side 28 and is reflected off the reflective surface 40 scaled by the intensity before transmission through the leading side 28. When the net scaled intensity for each mode is the same, the intensity ratios of each mode at the light sensor 34 approximates the intensity ratio of each intensity mode before experiencing the PDL sources. As a result, the effects of PDL are removed when the net scaled intensity for each mode is the same.

For a particular combination of the angle θ and the angle of incidence, the net scaled intensity of a particular mode after reflection can be determined by multiplying the scaled intensity of that mode after transmission as indicated in FIG. 8A by the scaled intensity of that mode after reflection as indicated in FIG. 8B. Combinations of the angle of incidence and the angle θ can be identified that result in the $T_E$ mode and the $T_M$ mode having about the same net scaled intensity. For instance, a direction changing region 14 constructed with the line labeled A in FIG. 8A is located at angle θ of about 38° degrees and the line labeled B in FIG. 8B is located at an angle of incidence of about 70° would be associated with a low level of PDL. After suitable combinations of the angle of incidence and the angle θ are identified, the combination that is most suitable to construction can be identified and the direction changing region constructed accordingly.

The above example presumes that the only source of PDL associated with the tap waveguide 12 and the direction changing region 14 is transmission through the leading side 28 and reflection off the reflective layer 40. The above method can be adapted to construct a direction changing region that compensates for other sources of PDL. For instance, the method can be adapted to construct a direction changing region that compensates for PDL that results from the transition from the primary waveguide 16 to the tap waveguide 12, from transmission through the leading side and from reflection off the reflecting surface. The scaled intensity of a particular mode after the transition from the primary waveguide to the tap waveguide is intensity of that mode scaled by the intensity of the most intense mode. As a result, the most intense mode after the transition will always have a scaled intensity of 1. For a particular combination of the angle θ and the angle of incidence, the net scaled intensity of a particular mode can be determined by multiplying the scaled intensity of that mode after transmission as indicated in FIG. 8A by the scaled intensity of that mode after reflection as indicated in FIG. 8B by the scaled intensity after the transition. Combinations of the angle of incidence and the angle θ can be identified that result in the $T_E$ mode and the $T_M$ mode having about the same net scaled intensity. After suitable combinations of the angle of incidence and the angle θ are identified, the combination that is most suitable to construction can be identified and the direction changing region constructed accordingly.

Constructing the direction changing region such that reflection off the one or more reflecting surfaces compensates for polarization associated with the tap waveguide or with the direction changing region can provide a net scaled polarization dependent loss less than +/−0.2, +/−0.1, +/−0.05, +/−0.02, +/−0.01, +/−0.001. The net scaled polarization dependent loss is the net scaled intensity of the $T_E$ polarization mode minus the net scaled intensity of the $T_M$ polarization mode. When the net scaled PDL is about 0, the output of the light sensor 34 is indicative of the conditions in the primary waveguide 16. The light absorbing medium 70 can also be employed to produce a net scale PDL other than zero.

Figure 9A:
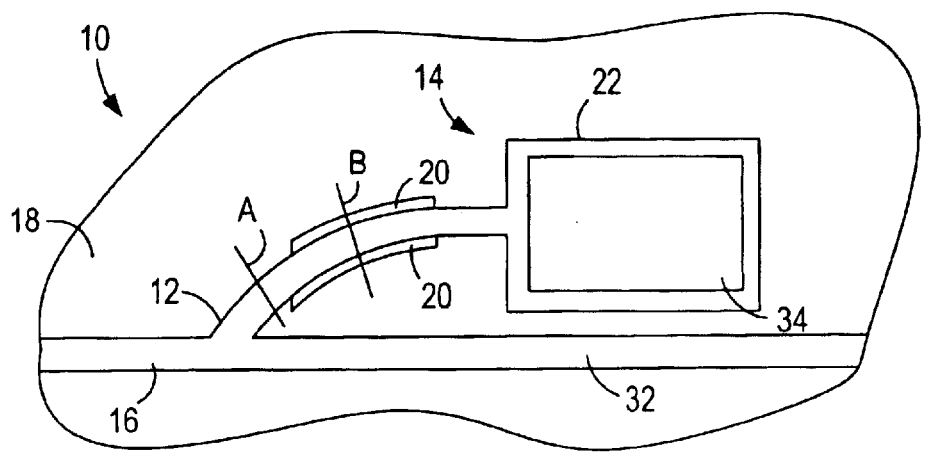
FIG. 9A is a topview of an optical component having a tap waveguide configured to compensate for polarization dependent loss. The tap waveguide includes light absorbing medium positioned adjacent to the lateral sides of the tap waveguide.
Figure 9B:
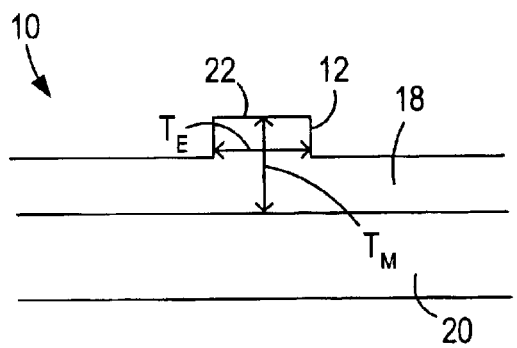
FIG. 9B is a cross section of the optical component shown in FIG. 9A taken at the line labeled A.
Figure 9C:
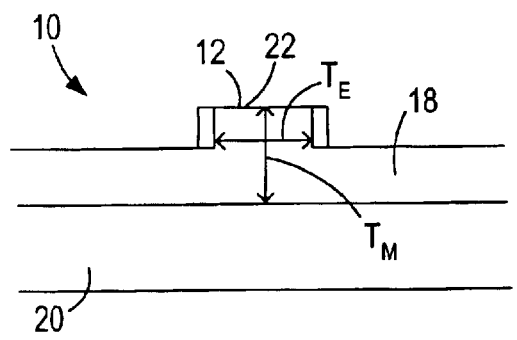
FIG. 9C is a cross section of the optical component shown in FIG. 9A taken at the line labeled B.

In some instances, the materials and/or construction of the direction changing region 14 are such that the PDL associated with reflection(s) in the direction changing region 14 does not balance the PDL from other sources. In these instances, the tap waveguide 12 can optionally include a light absorbing medium configured to compensate for polarization dependent loss as illustrated in FIG. 9A through FIG. 9D. FIG. 9A is a topview of the optical component 10. FIG. 9B is a cross section of the optical component 10 shown in FIG. 9A taken at the line labeled A. FIG. 9C is a cross section of the optical component 10 shown in FIG. 9A taken at the line labeled B.

The tap waveguide 12 includes two sections of light absorbing medium 70 configured to absorb one polarity mode more than another polarity mode. FIG. 9B and FIG. 9C illustrate polarity modes $T_E$ and $T_M$. As illustrated, $T_M$ is substantially vertical and $T_E$ IS substantially horizontal. The light absorbing media are shown as being positioned on the lateral sides of the tap waveguide 12. As is evident in FIG. 9C, the horizontal nature of the $T_E$ mode, causes the $T_E$ mode to interact with the light absorbing medium 70 more than the $T_M$ mode interacts with the light absorbing medium 70. As a result, more of the $T_E$ mode is absorbed than is the $T_M$ mode. Hence, the light absorbing medium 70 reduces the portion of the tapped light signal traveling in the $T_E$ mode more than the $T_M$ mode.

Figure 9D:
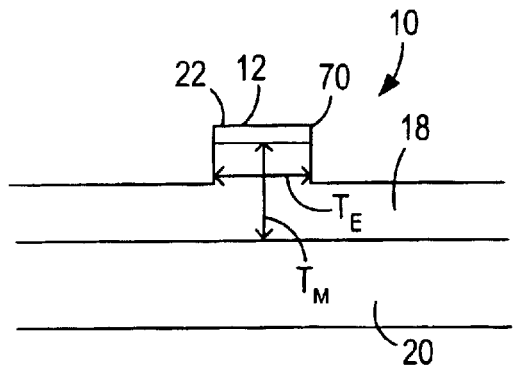
FIG. 9D is a cross section of an optical component having a tap waveguide configured to compensate for polarization dependent loss. The tap waveguide includes light absorbing medium positioned adjacent to the top of the tap waveguide.

As an alternative to positioning the light absorbing medium 70 on the lateral side of the tap waveguide 12, the light absorbing medium 70 can be positioned over the tap waveguide 12 as illustrated in FIG. 9D. The vertical nature of the $T_M$ mode causes the $T_M$ mode to interact with the light absorbing medium 70 more than the $T_E$ mode interacts with the light absorbing medium 70. As a result, more of the $T_M$ mode is absorbed than is the $T_E$ mode. Hence, the light absorbing medium 70 reduces the portion of the tapped light signal traveling in the $T_M$ mode more than the $T_E$ mode.

The light absorbing medium 70 serves as a controllable source of PDL. As a result, a target net scaled PDL can be achieved at the light sensor. Without the light absorbing medium 70, the net scaled PDL can be substantially greater than 0 at the light sensor 34. For instance, if more $T_E$ mode than $T_M$ mode enters the tap waveguide 12 from the primary waveguide 16 and there are not other significant sources of PDL, the net scaled PDL can be substantially greater than 0 at the light sensor 34. The light absorbing medium 70 can be positioned so as to reduce the net scaled PDL. Positioning the light absorbing medium 70 on the lateral sides of the tap waveguide 12 reduces the ratio of the $T_E$ mode intensity to the $T_M$ mode intensity at the light sensor 34 by absorbing more of the $T_E$ mode than the $T_M$ mode. Additionally, increasing the area of the tap waveguide 12 that is adjacent to the light absorbing medium 70 increases the drop in the net scaled PDL. As a result, the amount of the light absorbing medium 70 adjacent to the lateral sides of the tap waveguide 12 can be increased in order to reduce the net scaled PDL to a target level.

Without the light absorbing medium 70, the ratio of $T_E$ mode to the $T_M$ mode can be substantially less than 1 at the light sensor 34. The light absorbing medium 70 can be positioned so as to increase the net scaled PDL. Positioning the light absorbing medium 70 over the tap waveguide 12 increases the ratio of the $T_E$ mode to the $T_M$ mode at the light sensor 34 by absorbing more of the $T_M$ mode than the $T_E$ mode. Additionally, increasing the area of the tap waveguide 12 that is adjacent to the light absorbing medium 70 increases the rise in the ratio of the $T_E$ mode to the $T_M$ mode. As a result, the amount of the light absorbing medium 70 over the tap waveguide 12 can be increased to increase the net scaled PDL to a target level.

As noted, the light absorbing medium can be employed so as to increase or reduce the net scaled PDL. As a result, the light absorbing medium can be employed such that the net scaled PDL is less than +/−0.2, +/−0.1, +/−0.05, +/−0.02, +/−0.01, +−0.001. When the net scaled PDL is about 0, the output of the light sensor 34 is indicative of the conditions in the primary waveguide 16. The light absorbing medium 70 can also be employed to produce a net scale PDL other than zero.

Although FIG. 9C illustrates the light absorbing medium 70 primarily positioned adjacent to the lateral sides of the tap waveguide 12, the light absorbing medium can also extend part way or entirely over the tap waveguide 12. The combined positioning of the light absorbing medium 70 over the tap waveguide 12 and on the lateral sides of the tap waveguide 12 can serve to produce a particular ratio of $T_E$ absorption to $T_M$ absorption. A larger portion of the $T_E$ polarity mode is absorbed when the area of the light absorbing medium adjacent to the lateral sides of the tap waveguide is greater than the area of the light absorbing medium over the tap waveguide. In some instances, the area of the light absorbing medium over the tap waveguide is less than 90%, 50%, 30% 10%, 5% or 2% of the area adjacent to the lateral sides of the tap waveguide.

Although FIG. 9A and FIG. 9C illustrate the light absorbing medium 70 positioned on both lateral sides of the tap waveguide 12, the light absorbing medium 70 can be positioned on a single lateral side of the tap waveguide 12. Additionally, all or a portion of the light absorbing medium can be positioned on the direction changing region.

Figure 10A:
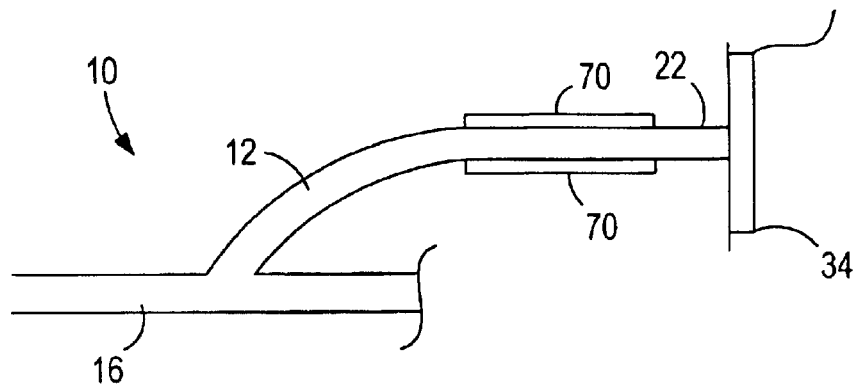
FIG. 10A and FIG. 10B illustrate a tap waveguide terminating at an edge of an optical component. The tap waveguide includes a light absorbing medium configured to compensate for polarization dependent loss.
Figure 10B:
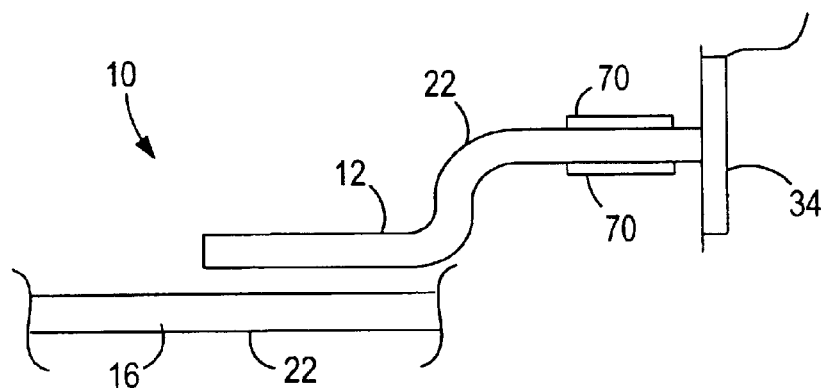

Light absorbing media can be employed to compensate the polarization dependent loss associated with other tap waveguides 12. For instance, FIG. 10A and FIG. 10B illustrate the light absorbing medium 70 employed in conjunction with a tap waveguide 12 that terminates at a light sensor 34 positioned at an edge of an optical component 10.

Suitable light absorbing media absorb portions of the light signal as the light signal interacts with the light absorbing medium 70. A variety of metals can serve as suitable light absorbing media. Suitable metals include, but are not limited to, Cu, Ag, Au, Al, W, Ni, Ti, Cr and Pt.

Figure 11A:
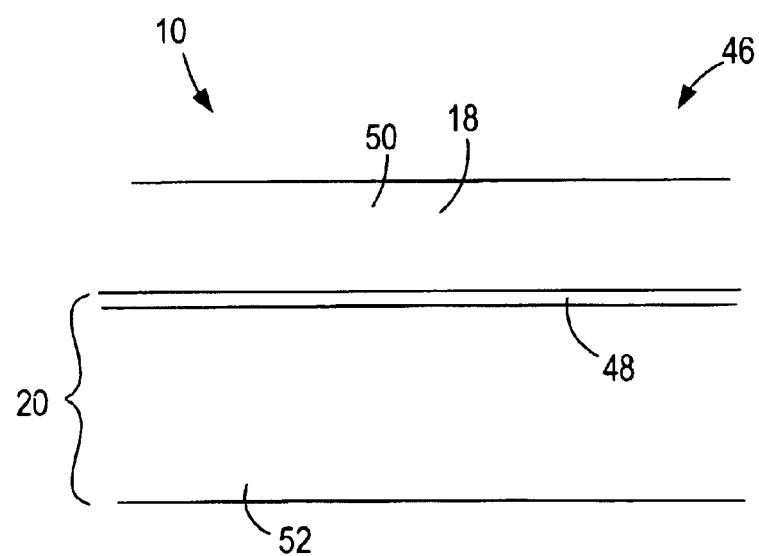
FIG. 11A through FIG. 11I illustrate a method of fabricating an optical component having a tap waveguide with a direction changing region.

FIG. 11A through FIG. 11I illustrate a method of fabricating an optical component 10 having a tap waveguide 12 with a direction changing region 14 according to FIG. 3. FIG. 11A is a sideview of a silicon-on-insulator wafer 46. As noted above, a silicon-on-insulator wafer 46 typically includes a silica layer 48, positioned between a silicon layer 50 and a silicon substrate 52. The silicon layer 50 serves as the first light transmitting medium 18. The silica layer 48 and the silicon substrate 52 serve as the base 20.

Figure 11C:
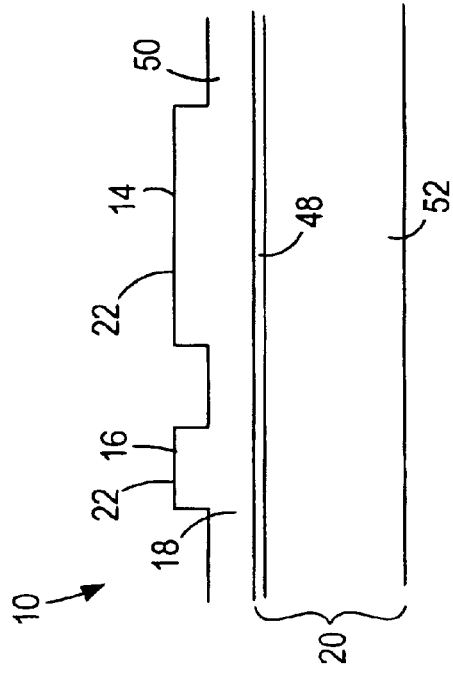
Figure 11E:
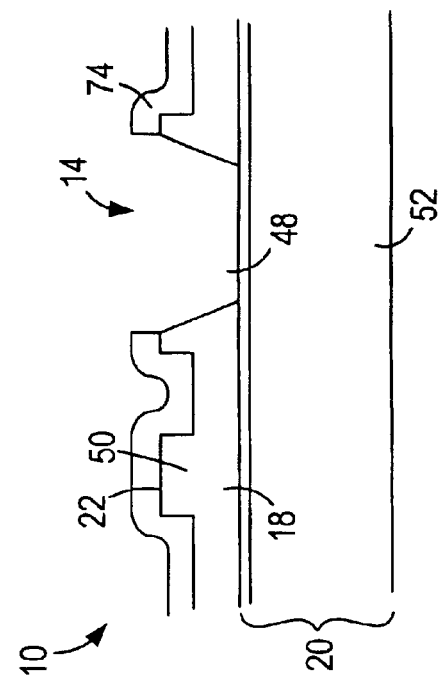
Figure 11B:
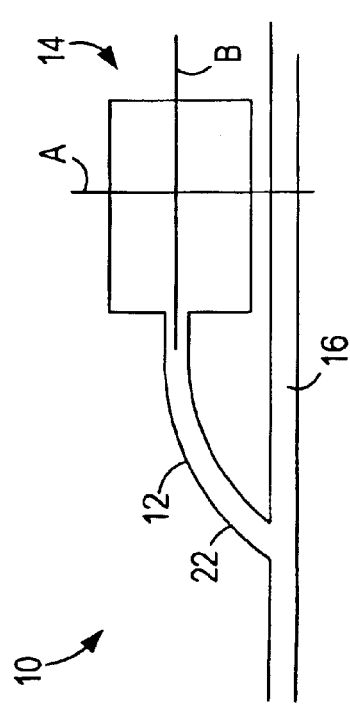

A mask is formed on the wafer so as to protect regions where ridges 22 are to be formed. A first etch is performed and the mask removed to provide the optical component 10 illustrated in FIG. 11B and FIG. 11C. FIG. 11B is a topview of the optical component 10 and FIG. 11C is a cross section of the optical component 10 shown in FIG. 11B taken at the line labeled A. The first etch forms the ridges 22 on the optical component 10. Accordingly, the first etch defines the primary waveguide 16 and the tap waveguide 12.

Figure 11D:
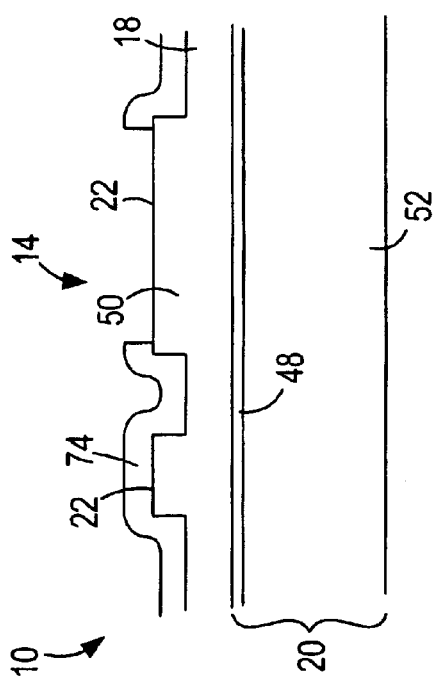
Figure 11F:
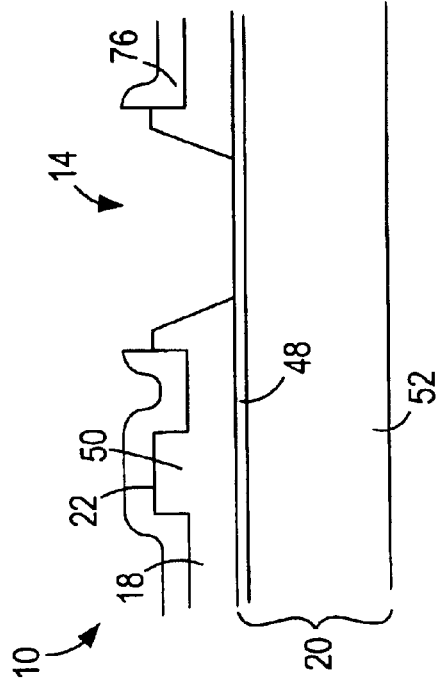

A mask 74 is formed on the optical component 10 so as to form the optical component 10 of FIG. 11D. FIG. 11D is the same cross section of the optical component 10 illustrated in FIG. 11C. The mask 74 is formed such that the region where the second light transmitting medium is to be positioned remains exposed. A suitable mask 74 includes, but is not limited to, a phoytresist and silica A second etch is performed and the mask 74 removed so as to provide the optical component 10 illustrated in FIG. 11F. The second etch is performed so as to form the lead side at a particular angle θ. The second etch can be a wet etch or a dry etch. When the second etch is a wet etch and the first light transmitting medium 18 is silicon, the angle θ is generally limited to about 55°. When a dry etch is employed, the angle θ can be controlled by changing the ratio of the etch gasses and/or by changing the amount of exposed area to be etched.

Figure 11G:
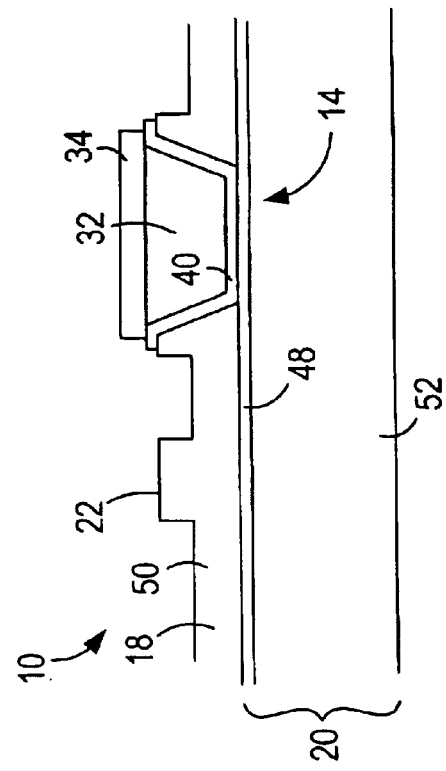

A second mask 76 is formed on the optical component 10 so as to form the optical component 10 of FIG. 11G. The second mask 76 is formed such that the region where the reflecting layer is to be positioned remains exposed. In particular, the second mask 76 is formed so as to protect the leading side 28 of the direction changing region 14. A suitable second mask 76 includes, but is not limited to, a photoresist.

Figure 11H:
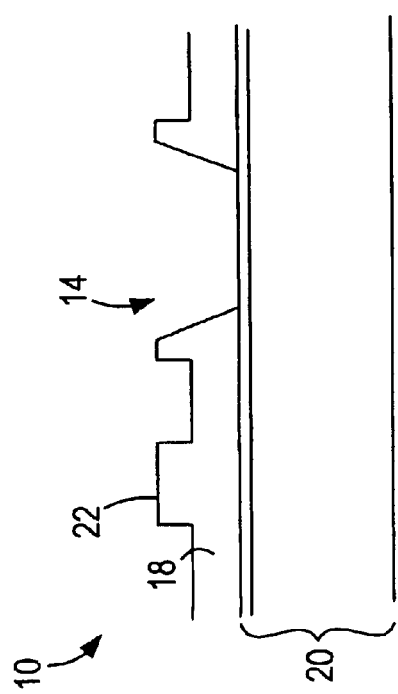

The reflective layer 40 is formed on the optical component 10 and the second mask 76 removed to provide the optical component 10 illustrated in FIG. 11H. The reflecting layer can be deposited or grown on the optical components. Suitable techniques for forming the reflecting layer include, but are not limited to, sputtering.

When the direction changing region 14 is to include a second light transmitting medium other than air, the second light transmitting medium can be formed over the reflective layer 40 before the second mask 76 is removed. The second light transmitting medium 32 can be grown or deposited on the reflecting layer. When the second light transmitting medium 32 is polyimide, suitable techniques for depositing the reflective layer include, but are not limited to, spinning. When the second light transmitting medium 32 is air, the second light transmittin medium need not be deposited or grown.

Figure 11I:
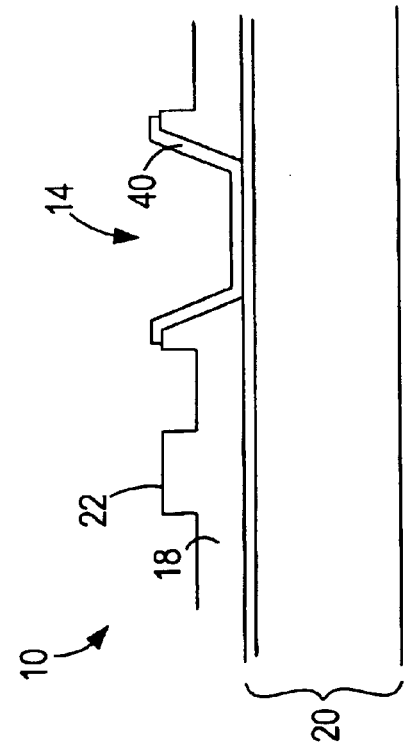

The light sensor 34 is coupled with the direction changing region 14 to provide the optical component 10 shown in FIG. 11I. An adhesive such as epoxy can be employed to bond the light sensor 34 with the direction changing region.

Figure 12A:
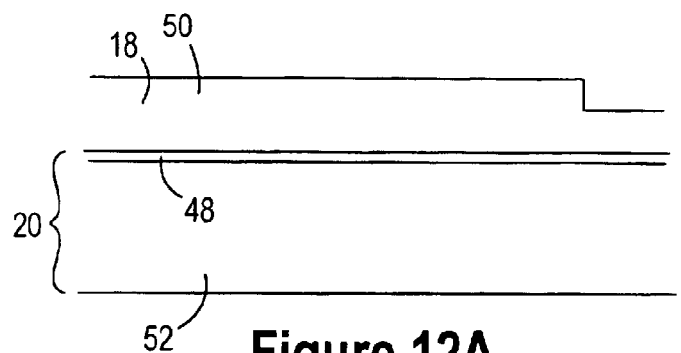
FIG. 12A through FIG. 12G illustrate a method of fabricating an optical component having a direction changing region constructed according to FIG. 4C.

FIG. 12A through FIG. 12G illustrate fabrication of an optical component 10 having a direction changing region 14 constructed according to FIG. 4C. FIG. 12A is a cross section of the optical component shown in FIG. 11B taken along the line labeled B. The optical component of FIG. 12A can be constructed as discussed with respect to FIG. 11A through FIG. 11C.

Figure 12B:
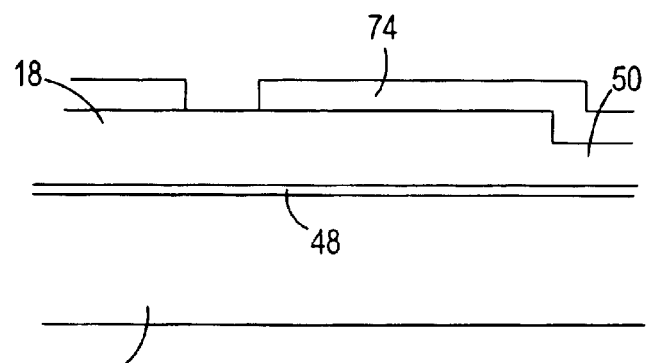
Figure 12C:
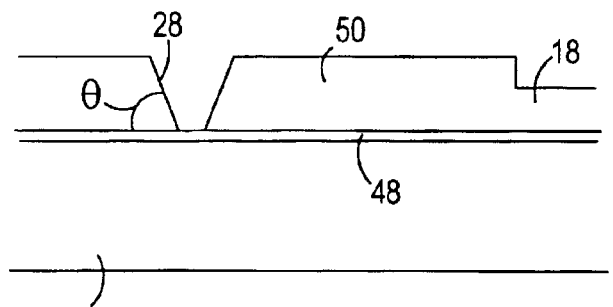

A mask 74 is formed on the optical component of FIG. 11A so as to form the optical component of FIG. 12B. The mask 74 is formed such that a portion of the direction changing region remains exposed. As will become evident below, the exposed portion of the direction changing region is positioned adjacent to the location where the leading side is to be formed.

A second etch is performed so as to provide the optical component shown in FIG. 1C. The second etch results in formation of the leading side. As a result, the second etch is performed so as to form the leading side with the desired angle θ. A suitable second etch is a dry etch.

Figure 12D:
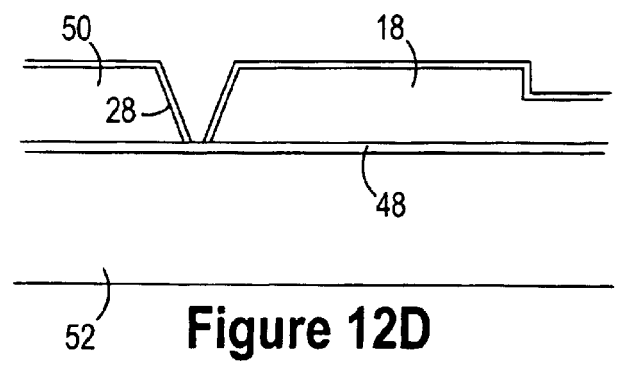

A protective layer 80 is formed on the optical component so as to provide the optical component shown in FIG. 12D. A suitable protective layer 80 can be etched at a different rate than the light transmitting medium 18. For instance, when the light transmitting medium 18 is silicon, silica can serve as the protective layer 80. Silicon can be converted to a silica protective layer 80. For instance, a thermal oxide treatment can be performed to convert a portion of the silicon to silica.

Figure 12E:
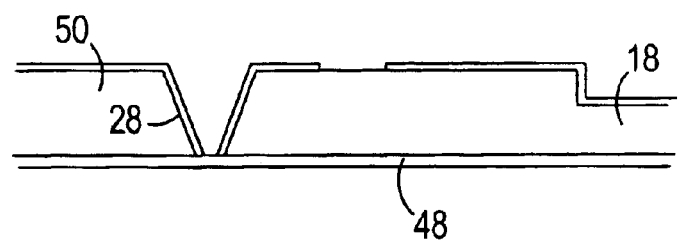

The protective layer 80 is masked and etched so as to provide the optical component of FIG. 12E. A portion of the direction changing region remains exposed. The exposed portion of the direction changing region is located between the location where the following 30 side is desired and the region removed during the second etch. As an alternative to forming the protective layer 80 of FIG. 12E as described above, the protective layer 80 of FIG. 12E can be formed as a mask.

Figure 12F:
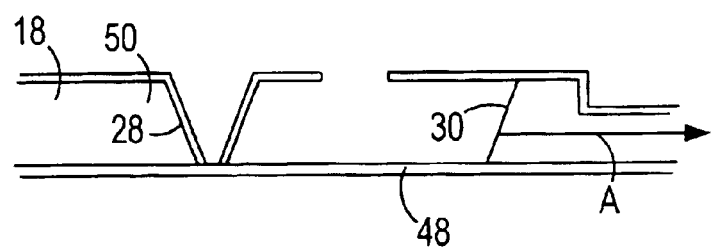

A third etch is performed so as to provide the optical component of FIG. 12F. A suitable third etch is a wet etch. The protective layer 80 and third etch are selected such that the third etch is selective for the light transmitting medium 18. The following side 30 is formed during the third etch. The location of the following side 30 is a result of the third etch duration. For instance, the following side 30 moves in the direction of the arrow labeled A as the duration of the third etch increases. Because the leading side and the following side are formed by different etches, the following side and the leading side can be formed at different angles.

Figure 12G:
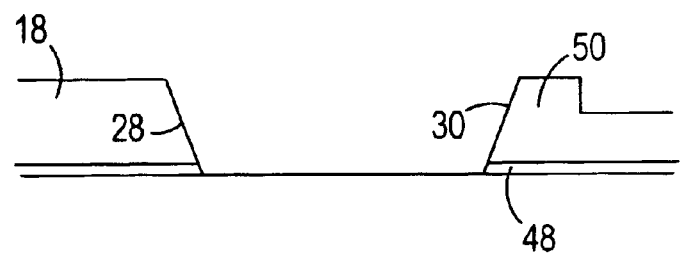

The protective layer 80 is removed to provide the optical component illustrated in FIG. 12G. When the protective layer 80 is silica, the protective layer 80 can be removed with a BOE ectch.

Figure 13A:
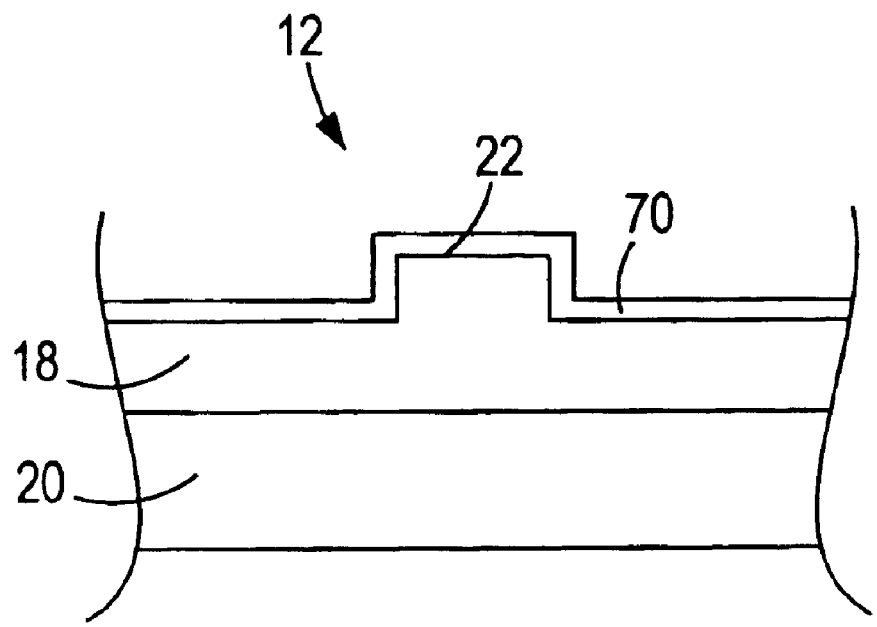
FIG. 13A through FIG. 13B illustrate a method of fabricating an optical component having a light absorbing medium positioned adjacent to the lateral sides of a tap waveguide.
Figure 13B:
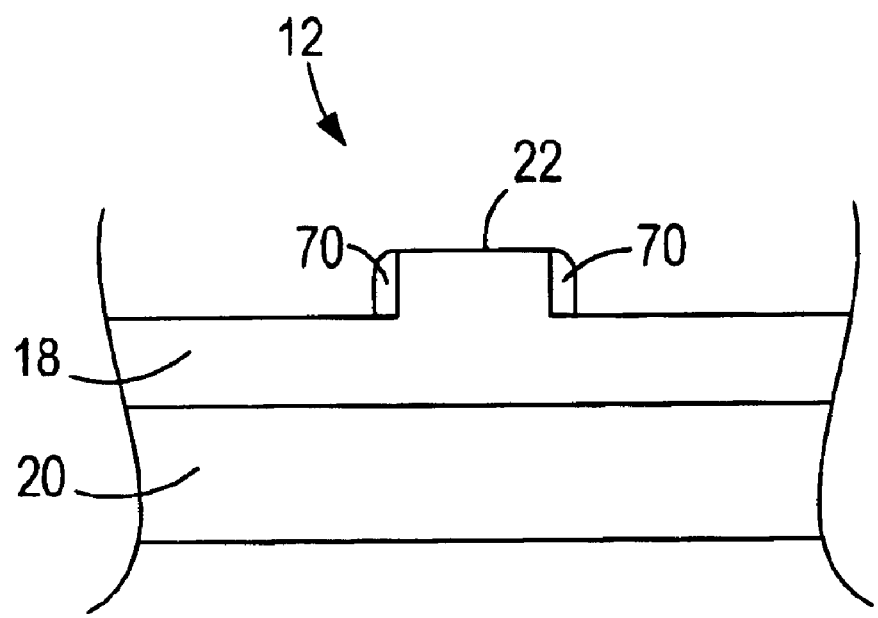

As noted above, a light absorbing medium can be formed on one or more sides of a tap waveguide. FIG. 13A and FIG. 13B illustrate a method of forming a light absorbing medium 70 on the lateral sides of a tap waveguide 12. As shown in FIG. 13A, the light absorbing medium 70 is formed over the desired region of the tap waveguide 12. The light absorbing medium 70 is shown as formed over the tap waveguide 12, adjacent to the lateral sides of the tap waveguides 12 and extending away from the lateral sides of the tap waveguide 12. The light absorbing medium 70 is thicker adjacent to the lateral sides of the tap waveguide 12 than over the tap waveguide 12. Additionally, the thickness of the light absorbing medium 70 over the tap waveguide is about the same as the thickness of the light absorbing medium 70 extending away from the tap waveguide 12. A mask can be employed to limit the light absorbing medium to particular regions of the optical component. For instance, the mask can be so as to form the light absorbing medium 70 adjacent to a limited length of the tap waveguide 12.

A vertical etch is performed to provide the optical component illustrated in FIG. 13B. The etch is performed for a duration sufficient to remove the light absorbing medium 70 from over the tap waveguide 12. Because the light absorbing medium 70 is thicker adjacent to the lateral sides of the tap waveguide 12 than over the tap waveguide 12, the light absorbing medium 70 is removed from over the tap waveguide 12 while a portion of the light absorbing medium 70 remains adjacent to the lateral sides of the waveguide 12. Because the light absorbing medium 70 over the tap waveguide 12 is about the same thickness as the light absorbing medium 70 extending away from the tap waveguide 70, the light absorbing medium 70 extending way from the tap waveguide 12 is removed during the etch. A suitable etch includes but is not limited to, a dry etch.

Although the direction changing region 14 is primarily disclosed in the context of a single reflection occurring as the light signals travel from the leading side 28 to the light sensor 34, the direction changing region 14 can be constructed such that a plurality of reflections occur as the light signals travel from the leading side 28 to the light sensor 34. Further, the direction changing region 14 can be constructed such that zero reflections occur as the light signals travel from the leading side 28 to the light sensor 34. For instance, the direction changing region 14 can be constructed such that the leading side 28 is angled in the opposite direction and/or such that the index of refraction of the second light transmitting medium 32 is greater than the index of refraction of the light transmitting medium. These modifications can cause the light signal to be diffracted directly from the leading side 28 to the light sensor 34.

Although the tap waveguide 12 and the primary waveguide 16 are ed as having about the same dimensions, the tap waveguide 12 and the waveguide 16 can have different dimensions.

Although the direction changing region 14 is disclosed as having a plurality of sides, the direction changing region 14 can be constructed with a single side. For intance, the direction changing region 14 can be constructed with a bowl shape.

Although the optical component 10 is disclosed in the context of optical components having ridge 22 waveguides, the principles of the present invention can be applied to optical components 10 having other waveguide types. Suitable waveguide types include, but are not limited to, buried channel waveguides and strip waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical component, comprising:
   a primary waveguide positioned on a base;
   a tap waveguide including a first light transmitting medium positioned on the base, the tap waveguide configured to receive a portion of a light signal traveling along the primary waveguide and to guide the received portion of the light signal through the first light transmitting medium, the portion of the light signal received by the tap waveguide being a tapped portion of the light signal;
   a direction changing region configured to receive the tapped portion of the light signal from the tap waveguide and direct the tapped portion of the light signal through a solid second light transmitting medium such that the tapped portion of the light signal travels away from the base, the second light transmitting medium having a different index of refraction than the first light transmitting medium; and
   a light sensor configured to receive the tapped portion of the light signal from the direction changing region.

2. The component of claim 1, wherein the direction changing region is configured to direct the tapped portion of the light signal away from the base at an angle in the range of 10° to 170° measured relative to the base.

3. The component of claim 1, wherein the direction changing region is configured to direct the tapped portion of the light signal away from the base at an angle greater than about 10° measured relative to the base.

4. The component of claim 1, wherein a leading side is positioned between the tap waveguide and the direction changing region, the leading side being angled at less than 90° relative to the base.

5. The component of claim 1, wherein a leading side is positioned between the tap waveguide and the direction changing region, the leading side being angled at an angle of about 45° to 90° relative to the base.

6. The component of claim 1, wherein a leading side is positioned between the tap waveguide and the direction changing region, the leading side being angled at an angle $\delta$ greater than 0°, the angle $\delta$ being measured relative to a plane that is perpendicular to the base and perpendicular to a longitudinal axis of the tap waveguide at the leading side.

7. The component of claim 1, wherein the direction changing region is constructed such that the tapped portion of the light signal is refracted at an angle $\phi$ upon entering the direction changing region, the angle $\phi$ being greater than 2° and being measured relative to the direction of propagation of the tapped portion in the tap waveguide at the interface of the tap waveguide and the direction changing region.

8. The component of claim 1, wherein the direction changing region is configured to reflect the tapped portion of the light signal toward the light sensor.

9. The component of claim 8, wherein the direction changing region is configured to reflect the tapped portion at an angle a measured relative to a direction of propagation of the tapped portion of the light signal along the tap waveguide, the angle $\alpha$ being greater than 10°.

10. The component of claim 8, wherein the direction changing region is configured to reflect the tapped portion of the light signal off a bottom side of the direction changing region.

11. The component of claim 8, wherein the direction changing region includes a following side opposite a leading side, the tapped portion of the light signal entering the direction changing region through the leading side, the direction changing region being configured to reflect the tapped portion of the light signal off the following side of the direction changing region toward the light sensor.

12. The component of claim 1, wherein the light sensor is positioned over the direction changing region.

13. The component of claim 1, further comprising:
   a light absorbing medium positioned adjacent to the tap waveguide.

14. The component of claim 13, wherein the light absorbing medium is configured to absorb one polarity of the tapped portion more than another polarity of the tapped portion.

15. The component of claim 14, wherein the light absorbing medium is configured to absorb the $T_E$ polarity mode more than the $T_M$ polarity mode.

16. The component of claim 14, wherein the light absorbing medium is configured such that the fraction of the tapped portion traveling in the $T_E$ polarity mode and the fraction of the tapped portion traveling in the $T_M$ polarity mode is about even at the light sensor.

17. The component of claim 14, wherein the light absorbing medium is positioned adjacent to the lateral sides of the tap waveguide.

18. The component of claim 14, wherein the light absorbing medium is positioned over the tap waveguide.

19. The component of claim 1, wherein the direction changing region includes one or more reflecting surfaces configured to reflect the tapped portion of the light signal, the one or more surfaces reflecting the tapped portion such that a resulting polarization dependent loss compensates for polarization dependent loss from one or more other sources.

20. The component of claim 19, wherein the one or more reflecting surfaces compensate for the polarization dependent loss such that the net scaled polarization dependent loss at the light sensor is less than 0.1.

21. The component of claim 19, wherein the one or more reflecting surfaces compensate for the polarization dependent loss such that the net scaled polarization dependent loss at the light sensor is less than 0.05.

22. The component of claim 19 wherein the one or more reflecting surfaces compensate for the polarization dependent loss such that the net scaled polarization dependent loss at the light sensor is less than 0.02.

23. The component of claim 19, wherein the one or more reflecting surfaces compensate for the polarization dependent loss such that the net scaled polarization dependent loss at the light sensor is less than 0.01.

24. A method of operating an optical component, comprising:

a receiving in a tap waveguide a portion of a light signal traveling through a first light transmitting medium of a primary waveguide, the portion of the light signal received by the tap waveguide being a tapped portion of the light signal;

directing the tapped portion of the light signal through a second light transmitting medium such that the tapped portion of the light signal travels away from the base, the second light transmitting medium having a different index of refraction than the first light transmitting medium; and receiving the tapped portion of the light signal at a light sensor.

25. The method of claim 24, wherein the tapped portion of the light signal is directed so as to away from the base at an angle in the range of 10° to 170° measured relative to the base.

26. The method of claim 24, wherein the tapped portion of the light signal is directed so as to away from the base at an angle greater than about 10° measured relative to the base.

27. The method of claim 24, wherein directing the tapped portion of the light signal includes reflecting the light signal off one or more sides of a direction changing region.

28. The component of claim 1, wherein the index of refraction of the second light transmitting medium is less than the index of refraction of the first light transmitting medium.

29. An optical component, comprising:

a tap waveguide and a primary waveguide positioned on a base, the tap waveguide configured to receive a portion of a light signal traveling along the primary waveguide, the portion of the light signal received by the tap waveguide being a tapped portion of the light signal;

a direction changing region configured to receive the tapped portion of the light signal from the tap waveguide and direct the tapped portion of the light signal such that the tapped portion of the light signal travels away from the base;

a light sensor configured to receive the tapped portion of the light signal from the direction changing region; and a light absorbing medium positioned adjacent to the tap waveguide such that the light absorbing medium absorbs one polarity of the tapped portion more than another polarity of the tapped portion as the tapped portion travels along the tap waveguide.

30. The component of claim 29, wherein the direction changing region is configured to direct the tapped portion of the light signal away from the base at an angle in the range of 10° to 170° measured relative to the base.

31. The component of claim 29, wherein a leading side is positioned between the tap waveguide and the direction changing region, the leading side being angled at less than 90° relative to the base.

32. The component of claim 29, wherein a leading side is positioned between the tap waveguide and the direction changing region, the leading side being angled at an angle δ greater than 0°, the angle δ being measured relative to a plane that is perpendicular to the base and perpendicular to a longitudinal axis of the tap waveguide at the leading side.

33. The component of claim 29, wherein the direction changing region is constructed such that the tapped portion of the light signal is refracted at an angle φ upon entering the direction changing region, the angle φ being greater than 2° and being measured relative to the direction of propagation of the tapped portion in the tap waveguide at the interface of the tap waveguide and the direction changing region.

34. The component of claim 29, wherein the direction changing region is configured to reflect the tapped portion of the light signal toward the light sensor.

35. The component of claim 34, wherein the direction changing region is configured to reflect the tapped portion at an angle α measured relative to α direction of propagation of the tapped portion of the light signal along the tap waveguide, the angle α being greater than 10°.

36. The component of claim 29, wherein the light sensor is positioned over the direction changing region.

37. The component of claim 29, wherein the light absorbing medium is configured to absorb the $T_E$ polarity mode more than the $T_M$ polarity mode.

38. The component of claim 29, wherein the light absorbing medium is configured such that the fraction of the tapped portion traveling in the $T_E$ polarity mode and the fraction of the tapped portion traveling in the $T_M$ polarity mode is about even at the light sensor.

39. The component of claim 29, wherein the light absorbing medium is positioned adjacent to the lateral sides of the tap waveguide.

40. The component of claim 29, wherein the light absorbing medium is positioned over the tap waveguide.

41. The component of claim 29, wherein the direction changing region includes one or more reflecting surfaces configured to reflect the tapped portion of the light signal, the one or more surfaces reflecting the tapped portion such that a resulting polarization dependent loss compensates for polarization dependent loss from one or more other sources.

42. The component of claim 41, wherein the one or more reflecting surfaces compensate for the polarization dependent loss such that the net scaled polarization dependent loss at the light sensor is less than 0.1.

43. The component of claim 41, wherein the one or more reflecting surfaces compensate for the polarization dependent loss such that the net scaled polarization dependent loss at the light sensor is less than 0.05.

44. The component of claim 41, wherein the one or more reflecting surfaces compensate for the polarization dependent loss such that the net scaled polarization dependent loss at the light sensor is less than 0.02.

45. The component of claim 29, wherein the light absorbing medium includes a metal.

46. The component of claim 29, wherein the light absorbing medium includes a metal selected from a group consisting of Cu, Ag, Au, Al, W, Ni, Ti, Cr and Pt.

* * * * *